United States Patent
Ikedo et al.

(10) Patent No.: US 10,255,814 B2
(45) Date of Patent: Apr. 9, 2019

(54) DRIVING ASSISTANCE APPARATUS

(71) Applicant: TOYOTA JIDOSHA KABUSHIKI KAISHA, Toyota-shi, Aichi-ken (JP)

(72) Inventors: Yuji Ikedo, Sunto-gun (JP); Ryo Morishita, Mishima (JP); Tomonori Akiyama, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/833,980

(22) Filed: Dec. 6, 2017

(65) Prior Publication Data

US 2018/0174465 A1  Jun. 21, 2018

(30) Foreign Application Priority Data

Dec. 21, 2016 (JP) ................. 2016-248139

(51) Int. Cl.
*B60Q 9/00* (2006.01)
*B60T 7/22* (2006.01)
(Continued)

(52) U.S. Cl.
CPC ............ *G08G 1/166* (2013.01); *B60Q 9/008* (2013.01); *B60T 7/22* (2013.01); *B60W 10/18* (2013.01);
(Continued)

(58) Field of Classification Search
CPC ...... G08G 1/166; B60W 10/18; B60W 50/14; B60W 30/0953; B60W 30/0956;
(Continued)

(56) References Cited

U.S. PATENT DOCUMENTS 8,583,341 B2 * 11/2013 Stahlin .................. B60W 30/16
  701/75
8,897,926 B2 * 11/2014 Stahlin ................ B60W 50/085
  701/1
(Continued)

FOREIGN PATENT DOCUMENTS

JP  2013-156688 A  8/2013
JP  5435172 B2  3/2014
(Continued)

*Primary Examiner* — Russell Frejd
(74) *Attorney, Agent, or Firm* — Oliff PLC

(57) ABSTRACT

A driving assistance apparatus includes a plurality of sensor devices and at least one electronic control unit. The electronic control unit estimates a linear path of a finite length extending in a traveling direction of a host vehicle as an expected path. The electronic control unit determines whether or not a target object that is an object having a possibility of crossing the expected path within a threshold time period is present, and determines whether or not a traffic situation estimated to hinder traveling of the target object occurs. The electronic control unit generates a driving assistance request signal when the electronic control unit determines that the target object is present and that the traffic situation does not occur, and forbids generation of the driving assistance request signal when the electronic control unit determines that the target object is present and that the traffic situation occurs.

4 Claims, 16 Drawing Sheets

(51) Int. Cl.
| | |
|---|---|
| *G06K 9/00* | (2006.01) |
| *G08G 1/16* | (2006.01) |
| *B60W 10/18* | (2012.01) |
| *B60W 30/18* | (2012.01) |
| *B60W 50/00* | (2006.01) |
| *B60W 50/14* | (2012.01) |
| *G01S 13/93* | (2006.01) |
| *B60W 30/095* | (2012.01) |

(52) U.S. Cl.
CPC .... *B60W 30/0953* (2013.01); *B60W 30/0956* (2013.01); *B60W 30/18154* (2013.01); *B60W 50/0097* (2013.01); *B60W 50/14* (2013.01); *G01S 13/931* (2013.01); *G06K 9/00805* (2013.01); *B60W 2540/18* (2013.01); *B60W 2550/30* (2013.01); *G01S 2013/9346* (2013.01); *G06K 2209/21* (2013.01)

(58) Field of Classification Search
CPC ....... B60W 30/18154; B60W 50/0097; B60W 2550/30; B60W 2540/18; G01S 13/931; G01S 2013/9346; B60T 7/22; B60Q 9/008; G06K 9/00805; G06K 2209/21
See application file for complete search history.

(56) References Cited

U.S. PATENT DOCUMENTS

| | | | |
|---|---|---|---|
| 9,135,219 B2* | 9/2015 | Binder | B60W 40/06 |
| 9,308,916 B2* | 4/2016 | Buerkle | B60W 50/14 |
| 2014/0028451 A1 | 1/2014 | Takahashi et al. | |
| 2016/0140847 A1 | 5/2016 | Kawamata et al. | |
| 2016/0318490 A1* | 11/2016 | Ben Shalom | B60T 7/12 |
| 2018/0120417 A1* | 5/2018 | Matsunaga | B60T 7/12 |

FOREIGN PATENT DOCUMENTS

| | | |
|---|---|---|
| JP | 2014-098965 A | 5/2014 |
| JP | 2016-095697 A | 5/2016 |

* cited by examiner

DRIVING ASSISTANCE APPARATUS

INCORPORATION BY REFERENCE

The disclosure of Japanese Patent Application No. 2016-248139 filed on Dec. 21, 2016 including the specification, drawings and abstract is incorporated herein by reference in its entirety.

BACKGROUND

1. Technical Field

The present disclosure relates to a driving assistance apparatus that has a function of calling attention of a driver of a vehicle or a function of automatically braking the vehicle when an object has a possibility of crossing a path through which the vehicle is expected to pass (hereinafter, simply referred to as an "expected path").

2. Description of Related Art

A driving assistance apparatus that is mounted in a vehicle and calls attention of a driver of the vehicle or automatically brakes the vehicle when an object has a possibility of crossing an expected path of the vehicle is known in the related art. Hereinafter, the vehicle in which the driving assistance apparatus is mounted will be referred to as a "host vehicle".

When a traveling direction of the host vehicle intersects with a traveling direction of the object at an intersection, an apparatus disclosed in, for example, Japanese Unexamined Patent Application Publication No. 2013-156688 (JP 2013-156688 A) (hereinafter, referred to as an "apparatus in the related art") predicts a first time period in which the host vehicle reaches the intersection, and a second time period in which the object reaches the intersection. Specifically, the apparatus in the related art predicts the first time period based on the position, the traveling direction, and the speed of the host vehicle at the current point in time, and predicts the second time period based on the position, the traveling direction, and the speed of the object at the current point in time.

The apparatus in the related art has a map that is set in advance. The map has a vertical axis denoting the first time period and a horizontal axis denoting the second time period. In the map, a region in which the absolute value of the difference in time between the first time period and the second time period is less than or equal to a predetermined value is set as an area in which the object has a possibility of crossing the expected path of the host vehicle (that is, an area in which attention is called). The other region of the map is set as an area in which the object has no possibility of crossing the expected path of the host vehicle (that is, an area in which attention is not called). The apparatus in the related art maps coordinates having components of the predicted first time period and the second time period on the map, determines whether or not the object has a possibility of crossing the expected path of the host vehicle by specifying the area in which the coordinates are positioned, and calls attention when the object has a possibility of crossing the expected path of the host vehicle.

SUMMARY

The configuration of the apparatus in the related art may call attention of the driver to the object even when the object actually has no possibility or a very low possibility of crossing the expected path of the host vehicle. That is, even when the traveling direction of the host vehicle intersects with the traveling direction of the object at the intersection and when the object is determined to need attention from the predicted first time period and second time period, the object may not actually cross the expected path of the host vehicle due to occurrence of any traffic situation that is estimated to hinder traveling of the object. According to a review of the inventors, such a traffic situation is, for example, a situation in which another vehicle that travels in the same direction as the host vehicle or the opposite direction to the host vehicle is present in front of or behind the host vehicle, or a traffic signal in the traveling direction of a vehicle determined to need attention (attention calling target vehicle) is lit red and causes the attention calling target vehicle to decelerate or stop. The apparatus in the related art does not consider occurrence of such a traffic situation. Thus, the apparatus in the related art calls attention at all times when attention calling is determined to be needed from the predicted first time period and second time period. Consequently, the apparatus in the related art may call attention to an object that does not need attention, and thus may give a feeling of inconvenience to the driver.

Such a problem is not limited to the driving assistance apparatus that calls attention when an object is determined to have a possibility of crossing the expected path of the host vehicle, and may also arise for a driving assistance apparatus that automatically brakes the host vehicle in such a case.

The present disclosure provides a driving assistance apparatus that can call attention of a driver of a host vehicle more appropriately or automatically brake the host vehicle more appropriately.

An aspect of the present disclosure relates to a driving assistance apparatus including a plurality of sensor devices and at least one electronic control unit. The sensor devices are mounted in a host vehicle and are configured to acquire host vehicle information including a parameter representing a traveling state of the host vehicle and object information including a relative position of an object being present around the host vehicle with respect to the host vehicle, a traveling direction of the object, and a speed of the object. The electronic control unit is configured to determine, based on the host vehicle information, whether or not the host vehicle is traveling straight. When the electronic control unit determines that the host vehicle is traveling straight, the electronic control unit is configured to estimate a linear path of a finite length extending in the traveling direction of the host vehicle from the host vehicle as an expected path based on the host vehicle information. The electronic control unit is configured to determine, based on the object information, whether or not a target object that is an object having a possibility of crossing the expected path within a threshold time period is present, and determine whether or not a traffic situation that is estimated to hinder traveling of the target object occurs. The electronic control unit is configured to generate a driving assistance request signal when the electronic control unit determines that the target object is present and that the traffic situation does not occur, and forbid generation of the driving assistance request signal when the electronic control unit determines that the target object is present and that the traffic situation occurs. The electronic control unit is configured to execute, in response to the driving assistance request signal, driving assistance of at least one of attention calling assistance and automatic braking assistance, the attention calling assistance calling attention of a driver to the target object, and the automatic braking assistance automatically braking the host vehicle.

According to the aspect of the present disclosure, the electronic control unit determines whether or not the target object that is the object having a possibility of crossing the expected path of the host vehicle within the threshold time period is present. When the electronic control unit determines that the target object is present, the electronic control unit performs driving assistance of calling attention of the driver of the host vehicle and/or automatically braking the host vehicle. For example, when the traffic situation estimated to hinder traveling of the target object occurs, the target object actually has a very low possibility of crossing the expected path of the host vehicle within the threshold time period even when the electronic control unit determines that the target object is present (that is, even when the electronic control unit performs driving assistance). Performing driving assistance in such a case is redundant and may give the driver a feeling of inconvenience. Thus, even when the electronic control unit determines that the target object is present, it is preferable not to perform driving assistance when the target object actually has a very low possibility of crossing the expected path of the host vehicle within the threshold time period due to the situation around the host vehicle.

Therefore, the driving assistance apparatus according to the aspect of the present disclosure further includes the electronic control unit that determines whether or not the traffic situation estimated to hinder traveling of the target object occurs. The electronic control unit is configured to forbid generation of the driving assistance request signal when the electronic control unit determines that the target object is present and that the traffic situation occurs.

According to the aspect of the present disclosure, the electronic control unit determines whether or not the traffic situation estimated to hinder traveling of the target object occurs. When the electronic control unit determines that the traffic situation occurs, the electronic control unit forbids attention calling and/or automatic braking even when the electronic control unit determines that the target object is present. When the traffic situation occurs, the target object has a very low possibility of crossing the expected path of the host vehicle within the threshold time period. Accordingly, when the target object actually has a very low possibility of crossing the expected path of the host vehicle within the threshold time period due to occurrence of the traffic situation, the driving assistance apparatus can forbid attention calling and/or automatic braking even when the driving assistance apparatus determines that the target object is present. Thus, the driving assistance apparatus can significantly reduce the possibility of performing unneeded attention calling and/or automatic braking and can more appropriately call attention of the driver of the host vehicle or automatically brake the host vehicle more appropriately.

In the driving assistance apparatus according to the aspect of the present disclosure, the electronic control unit may be configured to extract, based on the host vehicle information and the object information, a same direction object that is an object which travels with an angular difference with respect to the traveling direction of the host vehicle, is present in a same direction region set in advance around the host vehicle, and travels at a speed within a predetermined same direction speed range, the angular difference being less than or equal to a predetermined first threshold angular difference for same direction determination. The electronic control unit may be configured to extract, based on the host vehicle information and the object information, an opposite direction object that is an object which travels with an angular difference with respect to the traveling direction of the host vehicle, is present in an opposite direction region set around the host vehicle, and travels at a speed within a predetermined opposite direction speed range, the angular difference being greater than or equal to a predetermined second threshold angular difference for opposite direction determination. The electronic control unit may be configured to determine that the traffic situation occurs, when a value based on a total of the number of the same direction objects and the number of the opposite direction objects is greater than or equal to a predetermined value.

According to the aspect of the present disclosure, the same direction object is traveling with the angular difference with respect to the traveling direction of the host vehicle, and the angular difference is less than or equal to the predetermined first threshold angular difference for same direction determination, based on the host vehicle information and the object information. Thus, the traveling direction of the same direction object intersects with the traveling direction of the target object. The same direction object is traveling in the same direction region set around the host vehicle, within the predetermined same direction speed range. The opposite direction object is traveling with the angular difference with respect to the traveling direction of the host vehicle, and the angular difference is greater than or equal to the predetermined second threshold angular difference for opposite direction determination, based on the host vehicle information and the object information. Thus, the traveling direction of the opposite direction object intersects with the traveling direction of the target object. The opposite direction object is traveling in the opposite direction region set around the host vehicle, within the predetermined opposite direction speed range. Thus, the presence of the same direction object and the opposite direction object is considered to hinder traveling of the target object. Accordingly, by employing the configuration of determining that the traffic situation occurs when the value based on the total of the number of the same direction objects and the number of the opposite direction objects is greater than or equal to the predetermined value, a determination as to whether or not the traffic situation occurs can be appropriately performed.

In the driving assistance apparatus according to the aspect of the present disclosure, the electronic control unit may be configured to determine whether or not a left target object approaching the expected path from a left side of the traveling direction of the host vehicle is present among the target objects. The electronic control unit may be configured to extract, based on the host vehicle information and the object information, a left-side in-region same direction object that is an object which travels with an angular difference with respect to the traveling direction of the host vehicle, is present in a left-side same direction region set on the left side of the traveling direction of the host vehicle around the host vehicle, and travels at a speed within a predetermined same direction speed range, the angular difference being less than or equal to a predetermined first threshold angular difference for same direction determination. The electronic control unit may be configured to extract, based on the host vehicle information and the object information, a left-side in-region opposite direction object that is an object which travels with an angular difference with respect to the traveling direction of the host vehicle, is present in a left-side opposite direction region set on the left side of the traveling direction of the host vehicle around the host vehicle, and travels at a speed within a predetermined opposite direction speed range, the angular difference being greater than or equal to a predetermined second threshold angular difference for opposite direction determination. The electronic control unit may be configured to determine that a left traffic situation that is the traffic situation with respect to the left target object occurs, when a value based on a total of the number of the left-side in-region same direction objects and the number of the left-side in-region opposite direction objects is greater than or equal to a predetermined value. The electronic control unit may be configured to forbid generation of the driving assistance request signal for the left target object when the electronic control unit determines that the left target object is present and that the left traffic situation occurs.

According to the aspect of the present disclosure, the left-side in-region same direction object is traveling with the angular difference with respect to the traveling direction of the host vehicle, and the angular difference is less than or equal to the predetermined first threshold angular difference for same direction determination, based on the host vehicle information and the object information. Thus, the traveling direction of the left-side in-region same direction object intersects with the traveling direction of the left target object. The left-side in-region same direction object is traveling in the left-side same direction region set on the left side of the traveling direction of the host vehicle around the host vehicle, within the predetermined same direction speed range. The left-side in-region opposite direction object is traveling with the angular difference with respect to the traveling direction of the host vehicle, and the angular difference is greater than or equal to the predetermined second threshold angular difference for opposite direction determination, based on the host vehicle information and the object information. Thus, the traveling direction of the left-side in-region opposite direction object intersects with the traveling direction of the left target object. The left-side in-region opposite direction object is traveling in the left-side opposite direction region set on the left side of the traveling direction of the host vehicle around the host vehicle, within the predetermined opposite direction speed range. Thus, the presence of the left-side in-region same direction object and the left-side in-region opposite direction object is considered to hinder traveling of the left target object. Accordingly, by employing the configuration of determining that the left traffic situation occurs when the value based on the total of the number of the left-side in-region same direction objects and the number of the left-side in-region opposite direction objects is greater than or equal to the predetermined value, a determination as to whether or not the left traffic situation occurs can be appropriately performed.

In the driving assistance apparatus according to the aspect of the present disclosure, the electronic control unit may be configured to determine whether or not a right target object approaching the expected path from a right side of the traveling direction of the host vehicle is present among the target objects. The electronic control unit may be configured to extract, based on the host vehicle information and the object information, a right-side in-region same direction object that is an object which travels with an angular difference with respect to the traveling direction of the host vehicle, is present in a right-side same direction region set on the right side of the traveling direction of the host vehicle around the host vehicle, and travels at a speed within a predetermined same direction speed range, the angular difference being less than or equal to a predetermined first threshold angular difference for same direction determination. The electronic control unit may be configured to extract, based on the host vehicle information and the object information, a right-side in-region opposite direction object that is an object which travels with an angular difference with respect to the traveling direction of the host vehicle, is present in a right-side opposite direction region set on the right side of the traveling direction of the host vehicle around the host vehicle, and travels at a speed within a predetermined opposite direction speed range, the angular difference being greater than or equal to a predetermined second threshold angular difference for opposite direction determination. The electronic control unit may be configured to determine that a right traffic situation that is the traffic situation with respect to the right target object occurs, when a value based on a total of the number of the right-side in-region same direction objects and the number of the right-side in-region opposite direction objects is greater than or equal to a predetermined value. The electronic control unit may be configured to forbid generation of the driving assistance request signal for the right target object when the electronic control unit determines that the right target object is present and that the right traffic situation occurs.

According to the aspect of the present disclosure, the right-side in-region same direction object is traveling with the angular difference with respect to the traveling direction of the host vehicle, and the angular difference is less than or equal to the predetermined first threshold angular difference for same direction determination. Thus, the traveling direction of the right-side in-region same direction object intersects with the traveling direction of the right target object. The right-side in-region same direction object is traveling in the right-side same direction region set on the right side of the traveling direction of the host vehicle around the host vehicle, within the predetermined same direction speed range. The right-side in-region opposite direction object is traveling with the angular difference with respect to the traveling direction of the host vehicle, and the angular difference is greater than or equal to the predetermined second threshold angular difference for opposite direction determination. Thus, the traveling direction of the right-side in-region opposite direction object intersects with the traveling direction of the right target object. The right-side in-region opposite direction object is traveling in the right-side opposite direction region set on the right side of the traveling direction of the host vehicle around the host vehicle, within the predetermined opposite direction speed range. Thus, the presence of the right-side in-region same direction object and the right-side in-region opposite direction object is considered to hinder traveling of the right target object. Accordingly, by employing the configuration of determining that the right traffic situation occurs when the value based on the total of the number of the right-side in-region same direction objects and the number of the right-side in-region opposite direction objects is greater than or equal to the predetermined value, a determination as to whether or not the right traffic situation occurs can be appropriately performed.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION OF EMBODIMENTS

First Embodiment

Figure 1:
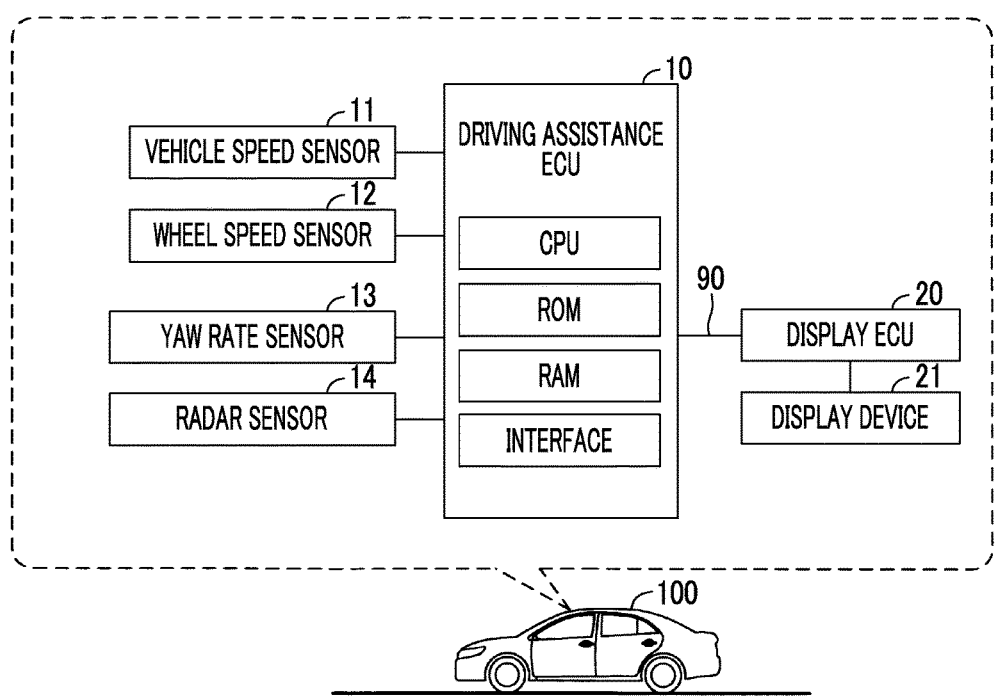
FIG. 1 is a diagram illustrating a driving assistance apparatus according to a first embodiment of the present disclosure (hereinafter, referred to as a "first embodied apparatus") and a vehicle to which the driving assistance apparatus is applied.

Hereinafter, a driving assistance apparatus according to a first embodiment (hereinafter, referred to as a "first embodied apparatus") will be described with reference to the drawings. The first embodied apparatus is applied to a host vehicle 100 illustrated in FIG. 1. The host vehicle 100 is an automobile that has an engine, not illustrated, as a power source. The first embodied apparatus includes a driving assistance ECU (one example of an electronic control unit) 10 and a display ECU 20.

ECU is the abbreviation for electronic control unit. Each of the driving assistance ECU 10 and the display ECU 20 is an electronic control circuit that has a main component of a microcomputer including a CPU, a ROM, a RAM, an interface, and the like. The CPU realizes various functions described below by executing instructions (routines) stored in a memory (ROM). The driving assistance ECU 10 and the display ECU 20 may be combined into one ECU.

The driving assistance ECU 10 and the display ECU 20 are connected to each other through a communication and sensor system controller area network (CAN) 90 in a manner capable of exchanging data (communicably).

The host vehicle 100 includes a vehicle speed sensor 11, a wheel speed sensor 12, a yaw rate sensor 13, a radar sensor 14, and a display device 21. The sensors 11 to 14 are connected to the driving assistance ECU 10, and the display device 21 is connected to the display ECU 20. While the host vehicle 100 includes a plurality of sensors detecting a driving state of the host vehicle 100 in addition to the sensors 11 to 14, the present embodiment will describe sensors related to the configuration of the driving assistance apparatus disclosed in the present specification.

The vehicle speed sensor 11 detects a speed (vehicle speed) SPDv [m/s] of the host vehicle 100 and outputs a signal indicating the vehicle speed SPDv to the driving assistance ECU 10. The driving assistance ECU 10 acquires the vehicle speed SPDv based on the signal received from the vehicle speed sensor 11 each time a predetermined calculation time period Tcal [s] elapses.

The wheel speed sensor 12 is disposed at each of right and left front wheels (not illustrated) and right and left rear wheels (not illustrated) of the host vehicle 100. Each wheel speed sensor 12 detects a rotational speed WS [rps] of each wheel and outputs a signal indicating the rotational speed WS to the driving assistance ECU 10. The driving assistance ECU 10 acquires the rotational speed WS of each wheel based on the signal received from each wheel speed sensor 12 each time the predetermined calculation time period Tcal elapses. The driving assistance ECU 10 can acquire the vehicle speed SPDv [m/s] based on the rotational speed WS.

The yaw rate sensor 13 detects an angular velocity (yaw rate) Y [°/sec] of the host vehicle 100 and outputs a signal indicating the yaw rate Y to the driving assistance ECU 10. The driving assistance ECU 10 acquires the yaw rate Y based on the signal received from the yaw rate sensor 13 each time the calculation time period Tcal elapses.

The radar sensor 14 is disposed at each of the left end and the right end of a front end portion of the host vehicle 100 and each of the left end and the right end of a rear end portion of the host vehicle 100. Each radar sensor 14 transmits an electromagnetic wave in a forward left diagonal direction, a forward right diagonal direction, a left rearward diagonal direction, and a right rearward diagonal direction of the host vehicle 100. When a body such as another vehicle or a pedestrian is present within the range of reach of the electromagnetic wave (hereinafter, referred to as a "transmitted wave"), the transmitted wave is reflected by the body. Each radar sensor 14 receives the reflected transmitted wave (hereinafter, referred to as a "reflective wave"). Each radar sensor 14 outputs a signal indicating the transmitted wave and a signal indicating the reflective wave to the driving assistance ECU 10. Hereinafter, a body that is present within the range of reach of the electromagnetic wave will be referred to as an "object".

The driving assistance ECU 10 determines whether or not an object having a possibility of crossing an expected path of the host vehicle 100 within a threshold time period is present (described below). When the driving assistance ECU 10 determines that the object is present, the driving assistance ECU 10 generates an attention calling request signal in order to call attention of a driver of the host vehicle 100 to the object and transmits the attention calling request signal to the display ECU 20. Hereinafter, the attention calling request signal will be simply referred to as a "request signal".

The display device 21 is a display device that is disposed in a position visually recognizable from a driving seat of the host vehicle 100 (for example, in an instrument cluster panel). When the display ECU 20 receives the request signal from the driving assistance ECU 10, the display ECU 20 transmits an instruction signal to the display device 21. When the display device 21 receives the instruction signal from the display ECU 20, the display device 21 displays information so as to call attention of the driver. The display device 21 may be a head-up display, a center display, or the like.

Summary of Operation of First Embodied Apparatus

Next, a summary of operation of the first embodied apparatus will be described. The first embodied apparatus performs two types of determination of a target object determination and a traffic situation determination described below along with each other. The target object determination is a determination as to whether or not an object having a possibility of crossing the expected path of the host vehicle 100 within the threshold time period (hereinafter, referred to as a "target object") is present. The traffic situation determination is a determination as to whether or not a traffic situation that is estimated to hinder traveling of the target object occurs. The first embodied apparatus determines whether or not to call attention (that is, whether or not to generate the request signal) based on the result of the two determinations.

A. Common Operation in Target Object Determination and Traffic Situation Determination First, common operation in the target object determination and the traffic situation determination will be described. When an engine switch (ignition key switch), not illustrated, of the host vehicle 100 is switched into an ON state, the first embodied apparatus acquires, before the engine switch is switched into an OFF state, information of the host vehicle 100 (host vehicle information) each time the calculation time period Tcal elapses, sets coordinate axes based on the host vehicle information with the current position of the host vehicle 100 as an origin, and calculates a velocity vector a of the host vehicle 100, the coordinates of a relative position P of the object, and a velocity vector b of the object. Hereinafter, a period in which the engine switch is switched from the ON state to the OFF state will be referred to as an "engine ON period". For any element e, the element e at an n-th calculation cycle will be denoted by e(n), and a point in time when the engine switch is switched into the ON state will be defined as n=0. The host vehicle 100 may be, for example, a hybrid vehicle or an electric vehicle. In such a case, for a start switch (for example, a ready switch) that sets the host vehicle 100 into a state capable of traveling, switching the start switch into the ON state has the same meaning as switching the engine switch into the ON state. Switching the start switch into the OFF state has the same meaning as switching the engine switch into the OFF state.

Acquisition of Host Vehicle Information and Setting of Coordinate Axes

Figure 2:
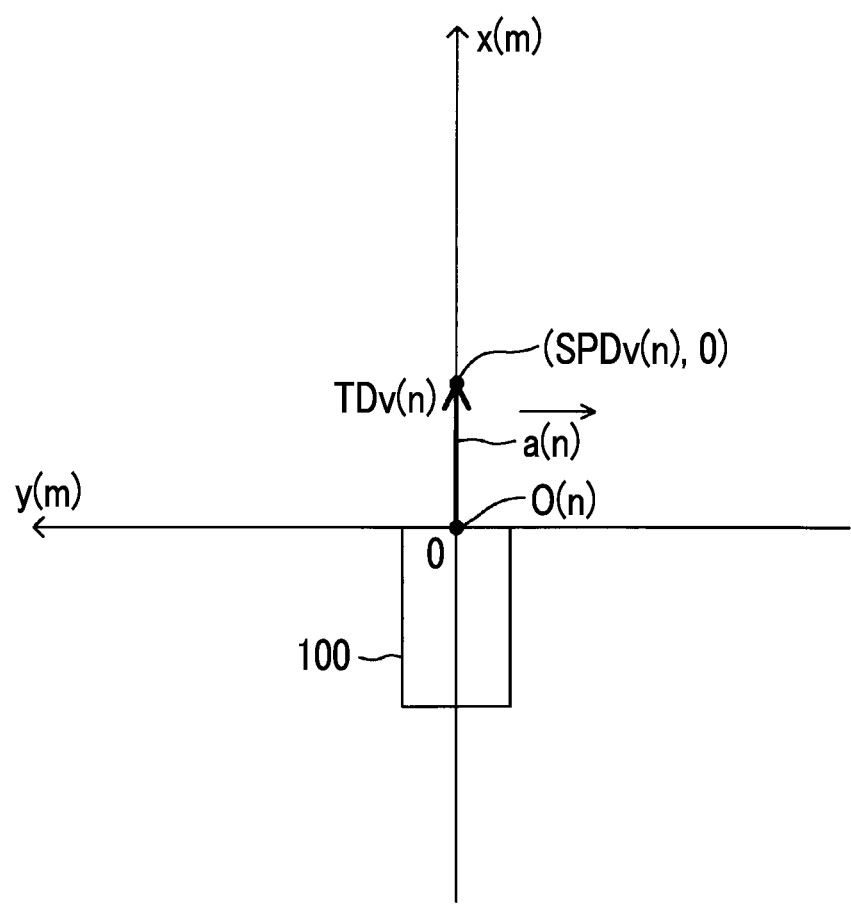
FIG. 2 is a diagram illustrating coordinate axes that are set by the first embodied apparatus around a host vehicle at an n-th cycle.

The driving assistance ECU 10 of the first embodied apparatus acquires the vehicle speed SPDv(n), the wheel speed WS(n), and the yaw rate Y(n) as the host vehicle information based on the signals received from the vehicle speed sensor 11, the wheel speed sensor 12, and the yaw rate sensor 13, and stores the host vehicle information in the RAM of the driving assistance ECU 10. The driving assistance ECU 10 sets coordinate axes based on the host vehicle information with the current position of the host vehicle 100 as an origin. Specifically, as illustrated in FIG. 2, the driving assistance ECU 10 sets the center of the front end portion of the host vehicle 100 at the n-th cycle as an origin O(n) (0,0) at the n-th cycle, sets an x axis in a traveling direction TDv(n) of the host vehicle 100 at the n-th cycle, and sets a y axis in a direction that passes through the origin O(n) and is orthogonal with respect to the traveling direction TDv(n). The x axis has the traveling direction TDv(n) as a positive direction, and the y axis has the left direction of the host vehicle 100 as a positive direction. The traveling direction TDv(n) is calculated from the vehicle speed SPDv(n) and the yaw rate Y(n) at the n-th cycle. The traveling direction may be calculated from the wheel speed WS(n) and a turning radius R(n) at the n-th cycle (that is, a value calculated based on the vehicle speed SPDv(n) and the yaw rate Y(n)). The driving assistance ECU 10 stores information indicating the coordinate axes in the RAM of the driving assistance ECU 10. The units of an x component and a y component in the xy coordinate plane are [m].

Acquisition of Vehicle Velocity Vector a

The driving assistance ECU 10 calculates the velocity vector a(n) of the host vehicle 100 at the n-th cycle (vehicle velocity vector a(n)) as a vector having a magnitude of the vehicle speed SPDv(n) of the host vehicle 100 at the n-th cycle and a direction of the traveling direction TDv(n) of the host vehicle 100 at the n-th cycle (refer to FIG. 2). The vehicle velocity vector a(n) is a vector having an x component of SPDv(n) and a y component of zero. The driving assistance ECU 10 stores the vehicle velocity vector a(n) in the RAM of the driving assistance ECU 10.

Acquisition of Object Information

Figure 3:
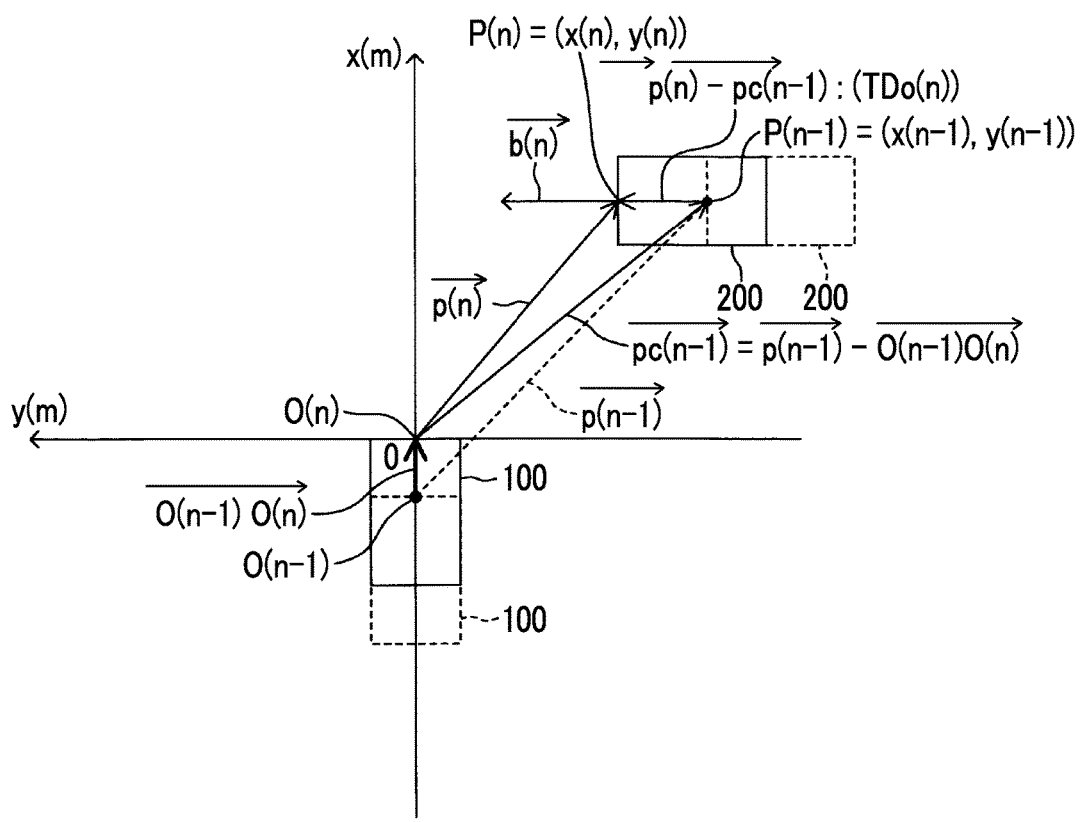
FIG. 3 is a diagram that illustrates a positional relationship between the host vehicle and an object at an (n−1)-th cycle and the n-th cycle and is used for describing acquisition of an object velocity vector of the object at the n-th cycle.

The driving assistance ECU 10 determines whether or not an object is present around the host vehicle 100 based on the signals received from each radar sensor 14. When the driving assistance ECU 10 determines that an object is present, the driving assistance ECU 10 acquires the distance from the host vehicle 100 to the object and the azimuth of the object with respect to the host vehicle 100. The driving assistance ECU 10 calculates coordinates (x(n),y(n)) of the relative position P(n) of the object at the n-th cycle with respect to the position of the host vehicle 100 at the n-th cycle (that is, the origin O(n)) from the distance and the azimuth of the object at the n-th cycle. In addition, as illustrated in FIG. 3, the driving assistance ECU 10 calculates, by the following procedure, a traveling direction TDo(n) and a speed SPDo(n) [m/s] of an object 200 that is one example of the object at the n-th cycle, and acquires a velocity vector b(n) of the object 200 at the n-th cycle (object velocity vector b(n)) based on the traveling direction TDo(n) and the speed SPDo(n) [m/s] of the object 200. In FIG. 3, the host vehicle 100 and the object 200 at the n-th cycle are illustrated by solid lines, and the host vehicle 100 and the object 200 at the (n−1)-th cycle are illustrated by broken lines.

Calculation of Traveling Direction TDo of Object

First, the driving assistance ECU 10 calculates a position vector p(n) of the relative position P(n) of the object 200 at the n-th cycle and the position vector p(n−1) of the relative position P(n−1) of the object 200 at the (n−1)-th cycle by General Formula (1) and General Formula (2).

$$p(n)=(x(n),y(n)) \quad (1)$$

$$p(n-1)=(x(n-1),y(n-1)) \quad (2)$$

As is apparent from General Formula (1) and General Formula (2), the components of the position vector p(n) are equal to the coordinates of the relative position P(n) of the object 200 at the n-th cycle, and the components of the position vector p(n−1) are equal to the coordinates of the relative position P(n−1) of the object 200 at the (n−1)-th cycle. That is, the position vector p(n) is a vector having the origin O(n) at the n-th cycle as a starting point, and the position vector p(n−1) is a vector having the origin O(n−1) at the (n−1)-th cycle as a starting point. Thus, both vectors have different starting points. Accordingly, the driving assistance ECU 10 transforms the position vector p(n−1) to a position vector pc(n−1) having the origin O(n) at the n-th cycle as a starting point by General Formula (3).

$$pc(n-1)=p(n-1)-O(n-1)O(n) \quad (3)$$

The vector O(n−1)O(n) is a vector from the origin O(n−1) at the (n−1)-th cycle to the origin O(n) at the n-th cycle. The vector O(n−1)O(n) is a vector that has a magnitude of a value acquired by multiplying the vehicle speed SPDv(n−1) of the host vehicle 100 at the (n−1)-th cycle by the calculation time period Tcal and has a direction of the traveling direction TDv(n−1) at the (n−1)-th cycle.

The driving assistance ECU 10 calculates a displacement direction of the object 200 from the (n−1)-th cycle to the n-th cycle by subtracting General Formula (3) from General Formula (1) by General Formula (4).

$$p(n)-pc(n-1)=p(n)-p(n-1)+O(n-1)O(n) \quad (4)$$

The driving assistance ECU 10 calculates the displacement direction of the object represented by General Formula (4) as the traveling direction TDo(n) of the object 200 at the n-th cycle.

Calculation of Speed SPDo of Object

Next, the driving assistance ECU 10 calculates the speed SPDo(n) of the object 200 at the n-th cycle by General Formula (5). The magnitude of a vector X is denoted by abs{X}.

$$SPDo(n)=abs\{p(n)-p(n-1)+O(n-1)O(n)\}/Tcal \quad (5)$$

That is, the driving assistance ECU 10 calculates, as the speed SPDo(n) of the object 200 at the n-th cycle, a value acquired by dividing the amount of displacement (abs{p(n)−p(n−1)+O(n−1)O(n)}) of the object 200 from the (n−1)-th cycle to the n-th cycle by the calculation time period Tcal.

Acquisition of Object Velocity Vector b

The driving assistance ECU 10 calculates the object velocity vector b(n) at the n-th cycle as a vector having a magnitude of the speed SPDo(n) of the object at the n-th cycle and a direction of the traveling direction TDo(n) of the object at the n-th cycle. The driving assistance ECU 10 stores the coordinates of the relative position P(n) and the velocity vector b(n) of the object in the RAM of the driving assistance ECU 10 as the object information. When each radar sensor 14 outputs signals reflected by the same object to the driving assistance ECU 10, the driving assistance ECU 10 acquires the object information as to the same object based on the signals.

B. Operation Related to Target Object Determination

Next, operation related to the target object determination will be described. In the engine ON period, or each time the calculation time period Tcal elapses, the driving assistance ECU 10 estimates the expected paths of the host vehicle 100 and the object and determines whether or not an object that intersects with the expected path of the host vehicle 100 within a threshold time period is present. When the driving assistance ECU 10 determines that such an object is present, the driving assistance ECU 10 determines that the object needs attention, and sets the value of an attention calling flag to 1 for the object. When the driving assistance ECU 10 determines that the object is not present, the driving assistance ECU 10 determines that the object does not need attention, and sets the value of the attention calling flag to 0 for the object.

Estimation of Left-Side Expected Path and Right-Side Expected Path of Host Vehicle 100

The driving assistance ECU 10 estimates an expected path through which a left end OL(n) (refer to FIG. 4) of the front end portion of the host vehicle 100 is expected to pass (left-side expected path), and an expected path through which a right end OR(n) (refer to FIG. 4) of the front end portion of the host vehicle 100 is expected to pass (right-side expected path). The driving assistance ECU 10 calculates the left-side expected path at the n-th cycle in the xy coordinate plane as a part of a line represented by a left-side expected path formula fL(n) illustrated in General Formula (6). The part has a finite length (7 m in the present example) from the host vehicle 100. The driving assistance ECU 10 calculates the right-side expected path at the n-th cycle in the xy coordinate plane as a part of a line represented by a right-side expected path formula fR(n) illustrated in General Formula (7). The part has a finite length (7 m in the present example) from the host vehicle 100. Each expected path is an expected path of the host vehicle 100 when traveling straight. The width (the length in the y-axis direction) of the host vehicle 100 is denoted by w. The width w is set in advance for each vehicle in which the driving assistance ECU 10 will be mounted.

$$\text{Left-side expected path formula } fL(n): y=w/2(x\geq 0) \quad (6)$$

$$\text{Right-side expected path formula } fR(n): y=-w/2 (x\geq 0) \quad (7)$$

Figure 4:
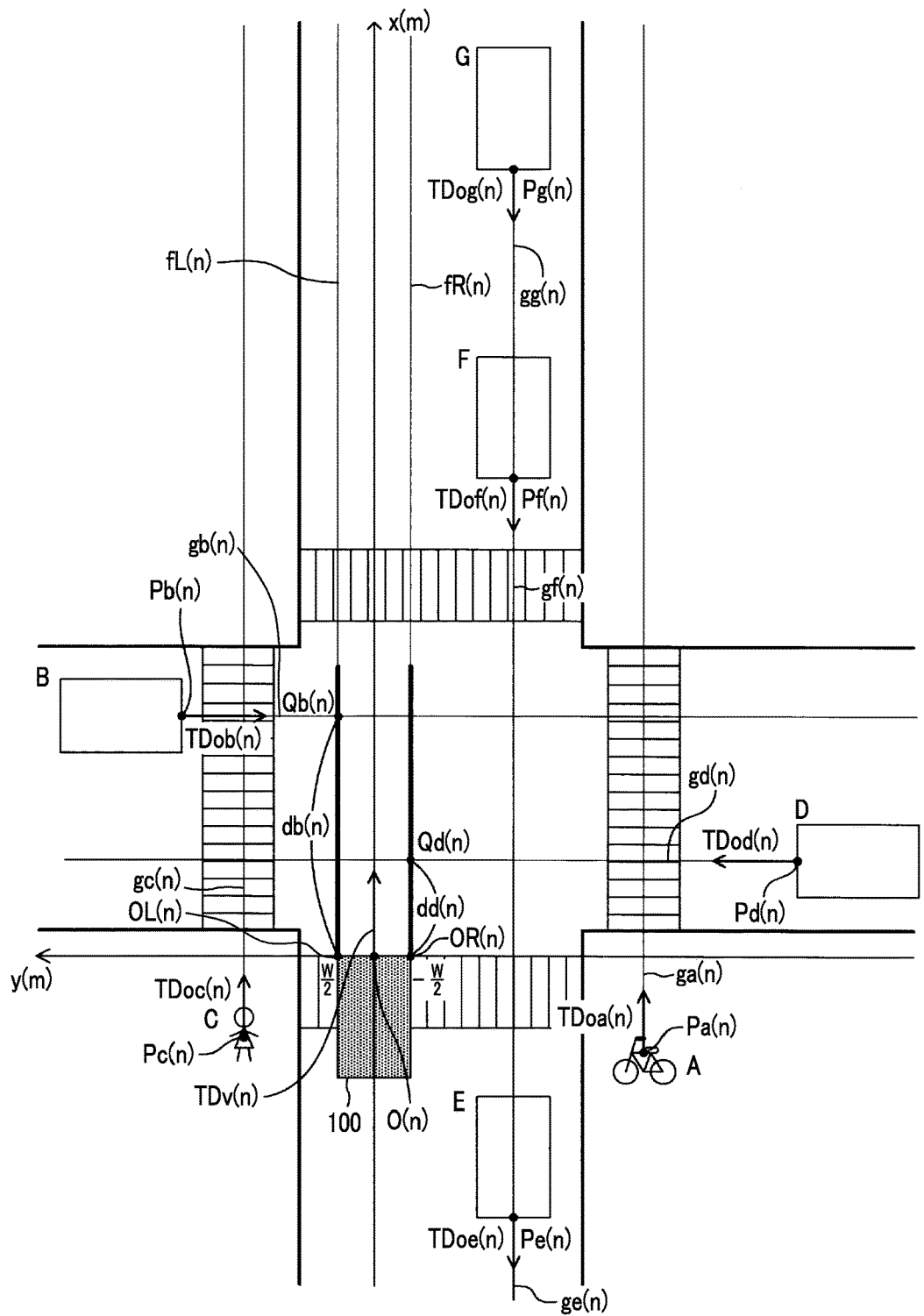
FIG. 4 is a diagram that illustrates an on-road positional relationship between the host vehicle and the object being present around the host vehicle at the n-th cycle and is used for describing the presence or absence of a target object at the n-th cycle.

As illustrated in FIG. 4, the coordinates of the left end OL(n) of the host vehicle 100 at the n-th cycle is (0,w/2), and the coordinates of the right end OR(n) of the host vehicle 100 at the n-th cycle is (0,−w/2). That is, the driving assistance ECU 10 calculates the left-side expected path formula fL(n) as a formula of a half line extending in the traveling direction TDv(n) of the host vehicle 100 from the left end OL(n) of the host vehicle 100. The driving assistance ECU 10 calculates the right-side expected path formula fR(n) as a formula of a half line extending in the traveling direction TDv(n) of the host vehicle 100 from the right end OR(n) of the host vehicle 100. The driving assistance ECU 10 stores the expected path formulas fL(n), fR(n) in the RAM of the driving assistance ECU 10.

Estimation of Expected Path of Object

The driving assistance ECU 10 estimates an expected path through which the object is expected to pass, based on the object information. The driving assistance ECU 10 calculates an expected path formula g(n) as a formula of a half line extending in the traveling direction TDo(n) of the object from the relative position P(n) of the object. The expected path formula g(n) represents the expected path of the object at the n-th cycle in the xy coordinate plane. A body A to a body G illustrated in FIG. 4 are bodies that are present within the range of reach of the electromagnetic wave transmitted by each radar sensor 14 of the host vehicle 100 at the n-th cycle (that is, objects). In the example in FIG. 4, based on the object information at the n-th cycle, the driving assistance ECU 10 calculates an expected path formula ga(n) to an expected path formula gg(n) respectively extending in a traveling direction TDoa(n) to a traveling direction TDog(n) of the object A to the object G (refer to arrows in FIG. 4) from a relative position Pa(n) to a relative position Pg(n) of the object A to the object G (hereinafter, the expected path formula g(n) will be simply referred to as a "formula g(n)"). The driving assistance ECU 10 stores the formula ga(n) to the formula gg(n) in the RAM of the driving assistance ECU 10.

Intersection Condition and Calculation of Coordinates of Intersection Q

The driving assistance ECU 10 determines whether or not an intersection condition is established. The intersection condition is that a line represented by the formula g(n) of the object (each of the formula ga(n) to the formula gg(n) in the present example) intersects with both of the line represented by the left-side expected path formula fL(n) of the host vehicle 100 and the line represented by the right-side expected path formula fR(n) of the host vehicle 100. When the driving assistance ECU 10 determines that the intersection condition is established, the driving assistance ECU 10 extracts the object as an object satisfying the intersection condition. The driving assistance ECU 10 calculates the coordinates of an intersection Q(n) at which the line represented by the formula g(n) of the extracted object intersects first with one of the lines represented by the left-side expected path formula fL(n) and the right-side expected path formula fR(n). When the driving assistance ECU 10 determines that the intersection condition is not established, the driving assistance ECU 10 does not extract the object. The driving assistance ECU 10 stores the extraction result and the coordinates of the intersection Q(n) in the RAM of the driving assistance ECU 10. As is apparent from the description, when the line represented by the formula g(n) of the object intersects with one of the two lines (that is, when the relative position P(n) of the object having the traveling direction TDo(n) intersecting with the traveling direction TDv(n) of the host vehicle 100 is positioned between the two lines), the intersection condition is not established.

In the example in FIG. 4, a line represented by the formula gb(n) for the object B intersects with both of the lines represented by the left-side expected path formula fL(n) and the right-side expected path formula fR(n) of the host vehicle 100 and intersects with the line represented by the left-side expected path formula fL(n) at a point Qb(n) first of both of the lines. A line represented by the formula gd(n) for the object D intersects with both of the lines represented by the left-side expected path formula fL(n) and the right-side expected path formula fR(n) and intersects with the line represented by the right-side expected path formula fR(n) at a point Qd(n) first of both of the lines. Accordingly, the driving assistance ECU 10 determines that the intersection condition is established for the object B and the object D, and extracts the object B and the object D as the object satisfying the intersection condition. The driving assistance ECU 10 calculates the coordinates of the intersection Qb(n) for the object B and calculates the coordinates of the intersection Qd(n) for the object D. Lines represented by the formula ga(n) for the object A, the formula gc(n) for the object C, and the formulas ge(n) to the gg(n) for the object E to the object G do not intersect with any of the lines represented by the left-side expected path formula fL(n) and the right-side expected path formula fR(n). Accordingly, the driving assistance ECU 10 determines that the intersection condition is not established for the object A, the object C, and the object E to the object and does not extract the object A, the object C, and the object E to the object G Calculation of Distance d and Length Condition When the driving assistance ECU 10 extracts an object as the object satisfying the intersection condition, the driving assistance ECU 10 calculates a distance d(n) [m] from the host vehicle 100 to the intersection Q(n) for the object. When the intersection Q(n) is positioned on a left-side expected path, the driving assistance ECU 10 calculates the distance d(n) as the distance from the left end OL(n) of the host vehicle 100 to the intersection Q(n). When the intersection Q(n) is positioned on a right-side expected path, the driving assistance ECU 10 calculates the distance d(n) as the distance from the right end OR(n) of the host vehicle 100 to the intersection Q(n). The driving assistance ECU 10 stores the distance d(n) in the RAM of the driving assistance ECU 10. The driving assistance ECU 10 determines whether or not a length condition is established. The length condition is that the distance d(n) is less than or equal to the length of each expected path of the host vehicle 100 (7 m in the present example). When the driving assistance ECU 10 determines that the length condition is established, the driving assistance ECU 10 extracts the object as an "object satisfying the length condition". When the driving assistance ECU 10 determines that the length condition is not established, the driving assistance ECU 10 does not extract the object. The driving assistance ECU 10 stores the extraction result in the RAM of the driving assistance ECU 10.

In the example in FIG. 4 where the object B and the object D are extracted as the object satisfying the intersection condition, a distance db(n) for the object B from the left end OL(n) of the host vehicle 100 to the intersection Qb(n) is less than or equal to the length of the left-side expected path (refer to a bold line in FIG. 4). A distance dd(n) for the object D from the right end OR(n) of the host vehicle 100 to the intersection Qd(n) is less than or equal to the length of the right-side expected path (refer to a bold line in FIG. 4). Accordingly, the driving assistance ECU 10 determines that the length condition is established for the object B and the object D, and extracts the object B and the object D as the object satisfying the length condition.

Calculation of Time Period t and Time Period Condition

When the driving assistance ECU 10 extracts an object as the object satisfying the length condition, the driving assistance ECU 10 calculates a time period t(n) in which the object is expected to reach the expected path. The driving assistance ECU 10 calculates the time period t(n) by dividing the "length from the relative position P(n) of the object to the intersection Q(n)" by the "speed SPDo(n) of the object". The driving assistance ECU 10 stores the time period t(n) in the RAM of the driving assistance ECU 10. The driving assistance ECU 10 determines whether or not a time period condition is established. The time period condition is that the time period t(n) is less than or equal to a threshold time period (4 seconds in the present example). When the driving assistance ECU 10 determines that the time period condition is established, the driving assistance ECU 10 extracts the object as an object satisfying the time period condition. When the driving assistance ECU 10 determines that the time period condition is not established, the driving assistance ECU 10 does not extract the object. The driving assistance ECU 10 stores the extraction result in the RAM of the driving assistance ECU 10.

In the example in FIG. 4, the driving assistance ECU 10 calculates a time period tb(n) and a time period td(n) respectively for the object B and the object D that are extracted as the object satisfying the length condition. The time period tb(n) is calculated by dividing the length from a relative position Pb(n) of the object B to the intersection Qb(n) by a speed SPDob(n) of the object B. The time period td(n) is calculated by the same method. For example, with time period tb(n)=2 seconds and time period td(n)=3 seconds, the time period tb(n) and the time period td(n) are less than or equal to the threshold time period. Thus, the driving assistance ECU 10 determines that the time period condition is established for the object B and the object D, and extracts the object B and the object D as the object satisfying the time period condition.

Left-Side Position Condition

When the driving assistance ECU 10 extracts an object as the object satisfying the time period condition, the driving assistance ECU 10 determines whether or not a left-side position condition is established. The left-side position condition is that the y coordinate of the relative position P(n) of the object is greater than or equal to w/2. When the driving assistance ECU 10 determines that the left-side position condition is established, the driving assistance ECU 10 determines that the relative position P(n) of the object is positioned on the left-side expected path or on the left side of the left-side expected path, and determines that the object approaches from the left side of the traveling direction TDv(n) of the host vehicle 100. In such a case, the driving assistance ECU 10 extracts the object as an "object satisfying the left-side position condition".

When the driving assistance ECU 10 determines that the left-side position condition is not established, the y coordinate of the relative position P(n) of the object extracted as the object satisfying the time period condition is less than or equal to −w/2 by the following reason. Thus, the driving assistance ECU 10 determines that the relative position P(n) of the object is on the right-side expected path or on the right side of the right-side expected path, and determines that the object approaches from the right side of the traveling direction TDv(n) of the host vehicle 100. That is, the determination of the left-side position condition is a determination that is performed when the intersection condition is established. As described in "Intersection Condition and Calculation of Coordinates of Intersection Q", when the y coordinate of the relative position P(n) of the object is greater than −w/2 and less than w/2, the object is positioned between the line represented by the left-side expected path formula fL(n) and the line represented by the right-side expected path formula fR(n), and the intersection condition is not established. Accordingly, the determination of the left-side position condition is not performed when the y coordinate of the relative position P(n) of the object is greater than −w/2 and less than w/2. Accordingly, when the driving assistance ECU 10 determines that the left-side position condition is not established, the y coordinate of the relative position P(n) of the object extracted as the object satisfying the time period condition is less than or equal to −w/2. When the driving assistance ECU 10 determines that the left-side position condition is not established, the driving assistance ECU 10 extracts the object as an "object not satisfying the left-side position condition". Hereinafter, the "object being positioned on the left side or the right side of the traveling direction TDv(n) of the host vehicle 100" will be simply represented as the "object being positioned on the left side or the right side of the host vehicle 100".

In the example in FIG. 4, the y coordinate of the relative position Pb(n) of the object B is less than or equal to w/2, and the left-side position condition is established. Thus, the driving assistance ECU 10 determines that the object B approaches from the left side of the host vehicle 100, and extracts the object B as the object satisfying the left-side position condition. The y coordinate of the relative position Pd(n) of the object D is greater than or equal to −w/2, and the left-side position condition is not established. Thus, the driving assistance ECU 10 determines that the object D approaches from the right side of the host vehicle 100, and extracts the object D as the object not satisfying the left-side position condition.

The left-side position condition may be different from the condition such that the left-side position condition is established when the y coordinate of the intersection Q(n) (that is, the intersection at which the line represented by the formula g(n) of the object intersects first with one of the lines represented by the expected path formulas fL(n), fR(n) of the host vehicle 100) is w/2. That is, when the object approaches from the left side of the host vehicle 100, the line represented by the formula g(n) intersects first with the line represented by the left-side expected path formula fL(n) (y=w/2 (x≥0)). Thus, the y coordinate of the intersection Q(n) is w/2, and the left-side position condition is established. When the object approaches from the right side of the host vehicle 100, the line represented by the formula g(n) intersects first with the line represented by the right-side expected path formula fR(n) (y=−w/2 (x≥0)). Thus, the y coordinate of the intersection Q(n) is −w/2, and the left-side position condition is not established. Such a configuration also enables an appropriate determination as to whether the object approaches from the left side or the right side of the host vehicle 100.

Setting of Attention Calling Flag

When the driving assistance ECU 10 extracts an object as the object satisfying the left-side position condition (that is, when the driving assistance ECU 10 determines that an object approaches from the left side of the host vehicle 100), the driving assistance ECU 10 determines that the object has a possibility of crossing the left-side expected path within the threshold time period. The driving assistance ECU 10 sets the value of a left-side attention calling flag to 1 and sets the value of a right-side attention calling flag to 0 for the object. The left-side attention calling flag and the right-side attention calling flag are one example of the attention calling flag. When the driving assistance ECU 10 extracts an object as the object not satisfying the left-side position condition (that is, when the driving assistance ECU 10 determines that an object approaches from the right side of the host vehicle 100), the driving assistance ECU 10 determines that the object has a possibility of crossing the right-side expected path within the threshold time period. The driving assistance ECU 10 sets the value of the right-side attention calling flag to 1 and sets the value of left-side attention calling flag to 0 for the object. When the driving assistance ECU 10 does not extract an object as the object satisfying all of the intersection condition, the length condition, and the time period condition (that is, the target object), the driving assistance ECU 10 determines that the object has a very low possibility of crossing each expected path within the threshold time period, and sets the value of the left-side attention calling flag and the value of the right-side attention calling flag to 0 for the object. As is apparent from the description, the values of the left-side attention calling flag and the right-side attention calling flag are not set to 1 at the same time for an object. The driving assistance ECU 10 retains the value of the attention calling flag set for each object in the RAM of the driving assistance ECU 10.

In the example in FIG. 4, the driving assistance ECU 10 sets the value of the left-side attention calling flag to 1 and sets the value of the right-side attention calling flag to 0 for the object B that is extracted as the object satisfying the left-side position condition. The driving assistance ECU 10 sets the value of the right-side attention calling flag to 1 and sets the value of the left-side attention calling flag to 0 for the object D that is extracted as the object not satisfying the left-side position condition. The driving assistance ECU 10 sets the value of the left-side attention calling flag and the value of the right-side attention calling flag to 0 for the object A, the object C, and the object E to the object G that are not extracted as the object satisfying the intersection condition.

C. Operation Related to Traffic Situation Determination

Next, operation related to the traffic situation determination will be described. In the engine ON period, or each time the calculation time period Tcal elapses, the driving assistance ECU 10 sets a region having a predetermined size around the host vehicle 100. The driving assistance ECU 10 counts, among objects being present in the predetermined region, the number of objects traveling in a direction approximately parallel to the traveling direction TDv of the host vehicle 100 within a predetermined speed range. When the driving assistance ECU 10 determines that the total number of objects that is the total of the number of objects in a predetermined period is greater than or equal to a predetermined threshold (threshold number of objects), the driving assistance ECU 10 determines that a situation in which the objects hinder traveling of the target object (hereinafter, the situation will be referred to as a "traffic situation") occurs, and sets the value of a traffic situation flag to 1. When the driving assistance ECU 10 determines that the total number of objects is less than the threshold, the driving assistance ECU 10 determines that the traffic situation does not occur, and sets the value of the traffic situation flag to 0. Hereinafter, a method of the traffic situation determination will be more specifically described.

Setting of Same Direction Region and Opposite Direction Region

Figure 5:
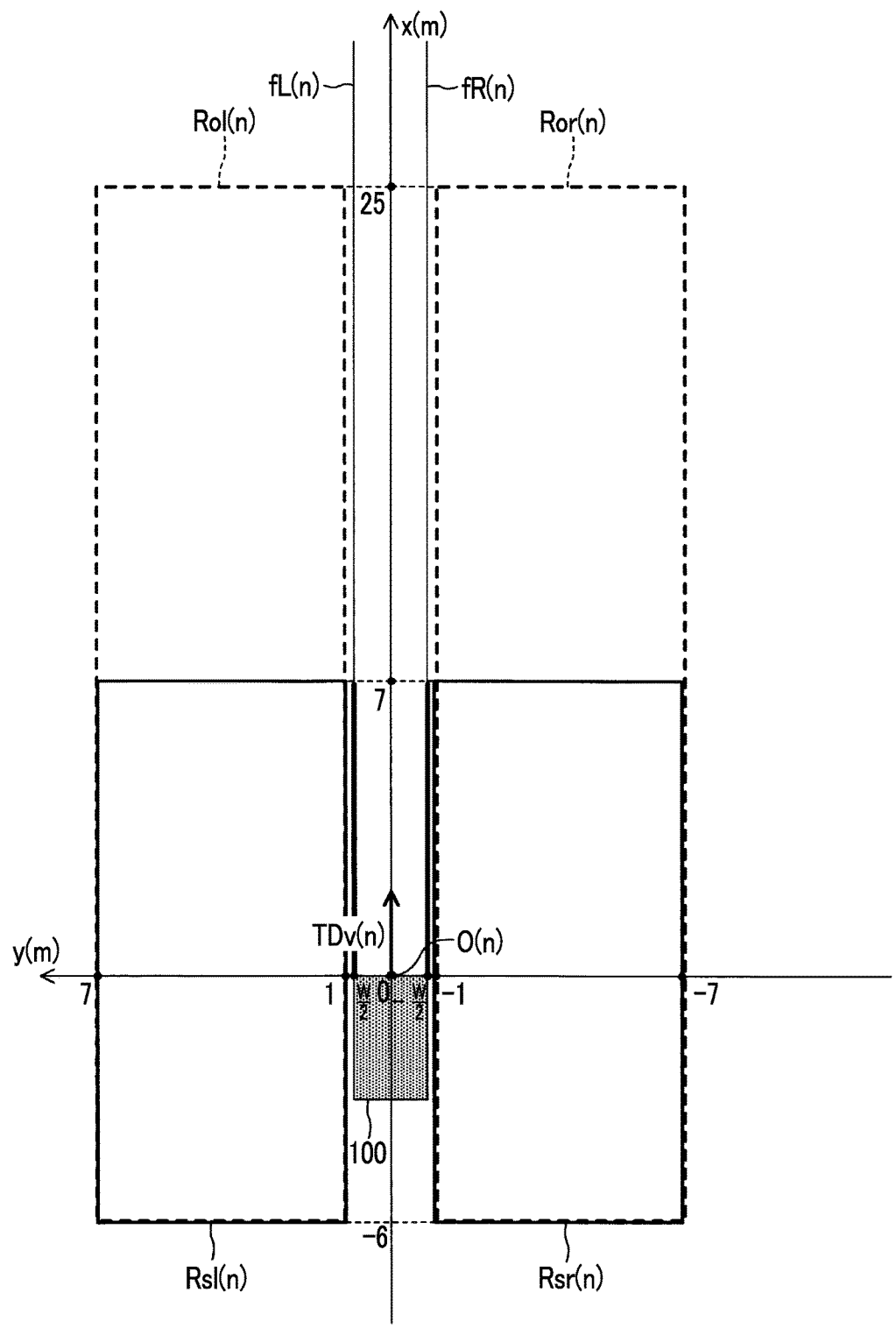
FIG. 5 is a diagram illustrating a left-side same direction region and a right-side same direction region and a left-side opposite direction region and a right-side opposite direction region that are set by the first embodied apparatus around the host vehicle at the n-th cycle.

As illustrated in FIG. 5, the driving assistance ECU 10 sets four regions, that is, a left-side same direction region Rsl, a right-side same direction region Rsr, a left-side opposite direction region Rol, and a right-side opposite direction region Ror, around the host vehicle 100 by General Formula (8) to General Formula (11). Hereinafter, the regions will be respectively referred to as a "region Rsl", a "region Rsr", a "region Rol", and a "region Ror".

Left-side same direction region $Rsl(n)$: $-6 \leq x(n) \leq 7$ and $1 \leq y(n) \leq 7$ (8)

Right-side same direction region $Rsr(n)$: $-6 \leq x(n) \leq 7$ and $-7 \leq y(n) \leq -1$ (9)

Left-side opposite direction region $Rol(n)$: $-6 \leq x(n) \leq 25$ and $1 \leq y(n) \leq 7$ (10)

Right-side opposite direction region $Ror(n)$: $-6 \leq x(n) \leq 25$ and $-7 \leq y(n) \leq -1$ (11)

That is, the left-side same direction region Rsl(n) is a rectangular region that has a long edge having a length of 13 m in the traveling direction TDv(n) of the host vehicle 100 (that is, in the x-axis direction) and a short edge having a length of 6 m in a direction orthogonal with respect to the traveling direction TDv(n) (that is, in the y-axis direction). A long edge, of the two long edges of the region Rsl(n), on the right side (the host vehicle 100 side) is separated by 1 m from the origin O(n) of the host vehicle 100. When a range of x≥0 in the xy coordinate plane is defined as the "front of the host vehicle 100", the length of a part of the long edge of the region Rsl(n) positioned in front of the host vehicle 100 is 7 m and is equal to the length of the left-side expected path (refer to a bold line in FIG. 5). The right-side same direction region Rsr(n) has an axially symmetric relationship with the left-side same direction region Rsl(n) about the x axis. Thus, the length of a part of the long edge of the region Rsr(n) positioned in front of the host vehicle 100 is also 7 m and is equal to the length of the right-side expected path (refer to a bold line in FIG. 5). Hereinafter, the left-side same direction region Rsl(n) and the right-side same direction region Rsr(n) may be collectively referred to as a "same direction region Rs(n)".

The left-side opposite direction region Rol(n) is a rectangular region that has a long edge having a length of 31 m in the traveling direction TDv(n) of the host vehicle 100 and a short edge having a length of 6 m in a direction orthogonal with respect to the traveling direction TDv(n). A long edge, of the two long edges of the region Rol(n), on the right side is separated by 1 m from the origin O(n) of the host vehicle 100. The length of a part of the long edge of the region Rol(n) positioned in front of the host vehicle 100 is 25 m and is longer than the length of the left-side expected path. The right-side opposite direction region Ror(n) has an axially symmetric relationship with the left-side opposite direction region Rol(n) about the x axis. Thus, the length of a part of the long edge of the region Ror(n) positioned in front of the host vehicle 100 is also 25 m and is longer than the length of the right-side expected path.

The range of reach of the electromagnetic wave transmitted by each radar sensor 14 is wider than each of the regions Rsl(n), Rsr(n), Rol(n), Ror(n). Hereinafter, the left-side opposite direction region Rol(n) and the right-side opposite direction region Ror(n) may be collectively referred to as an "opposite direction region Ro(n)". A formula of a region representing each of the region Rsl(n), the region Rsr(n), the region Rol(n), and the region Ror(n) (in other words, the coordinates of each corner portion of each region) can be appropriately set. Both of the region Rsl(n) and the region Rol(n) have to be set on the left side of the host vehicle 100. Both of the regions Rsr(n) and the region Ror(n) have to be set on the right side of the host vehicle 100. Both of the region Rsl(n) and the region Rsr(n) have to have a region in the opposite direction to the traveling direction TDv(n) with respect to the origin O(n). Both of the region Rol and the region Ror preferably have a region in the same direction as the traveling direction TDv(n) with respect to the origin O(n).

Calculation of Angular Difference θ

Figure 6:
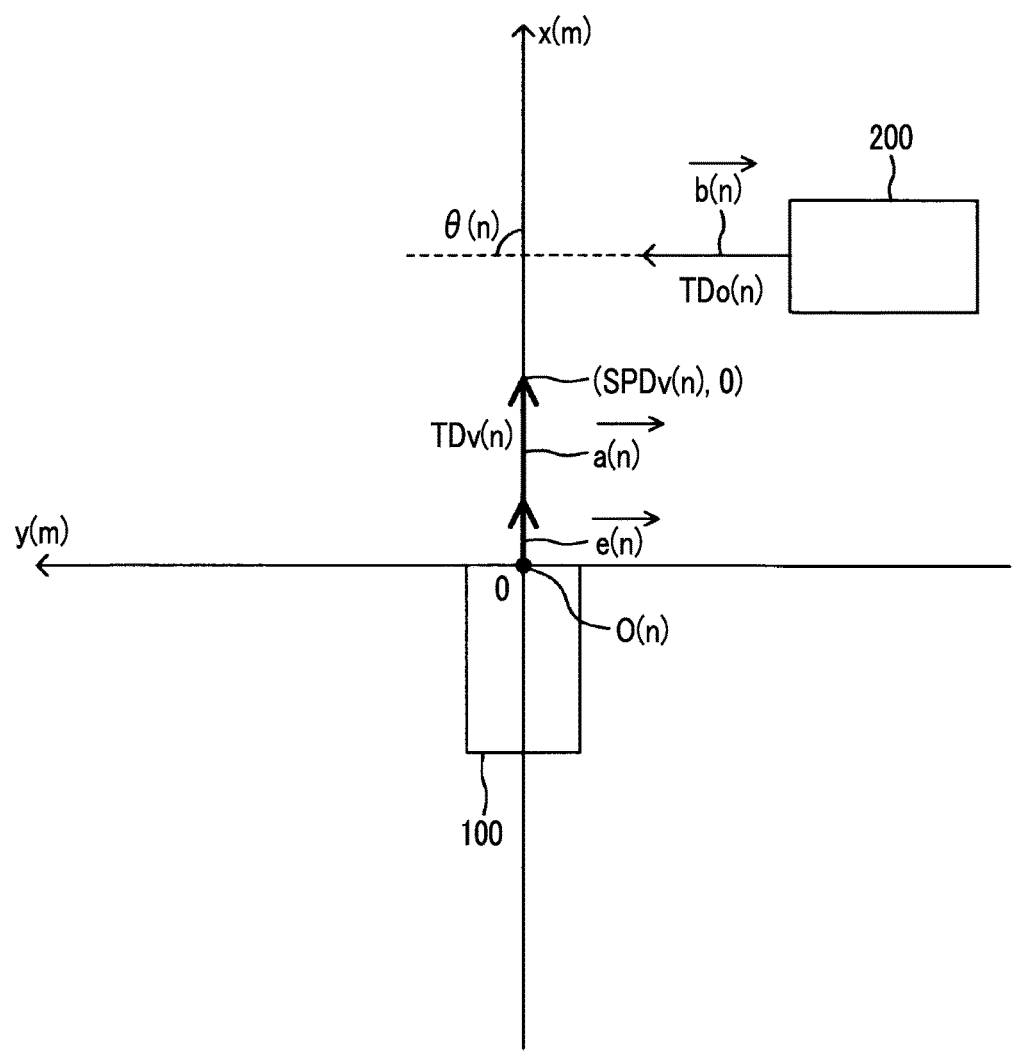
FIG. 6 is a diagram used for describing calculation of an angular difference between a traveling direction of the host vehicle and a traveling direction of the object at the n-th cycle.

The driving assistance ECU 10 calculates an angular difference $\theta(n)$ ($0° \leq \theta(n) \leq 180°$) between the traveling direction TDv(n) of the host vehicle 100 and the traveling direction TDo(n) of the object. The angular difference θ(n) is the magnitude of the angle between the traveling direction TDv(n) and the traveling direction TDo(n) of the object. As illustrated in FIG. 6, the driving assistance ECU 10 calculates the angular difference θ(n) based on a unit vector e(n) of the vehicle velocity vector a(n) of the host vehicle 100 and the object velocity vector b(n) of the object 200 as one example of the object. Specifically, a relationship in General Formula (12) is established between the unit vector e(n) and the object velocity vector b(n).

$$e(n) \cdot b(n) = \text{abs}(e(n)) \times \text{abs}(b(n)) \times \cos \theta(n) \quad (12)$$

The magnitude of the unit vector e(n) is one. Thus, when General Formula (12) is modified by substituting abs(e(n))

=1, General Formula (13) is acquired. The driving assistance ECU 10 calculates the angular difference θ(n) by using General Formula (13).

$$\cos \theta(n) = e(n) \cdot b(n) / \{abs(b(n))\} \quad (13)$$

That is, the driving assistance ECU 10 calculates the angular difference θ(n) by using the inner product of the unit vector e(n) of the vehicle velocity vector a(n) and the object velocity vector b(n). The driving assistance ECU 10 stores the angular difference θ(n) in the RAM of the driving assistance ECU 10. The numerator e(n)·b(n) on the right-hand side of General Formula (13) is equal to the x component of the object velocity vector b(n).

Figure 7:
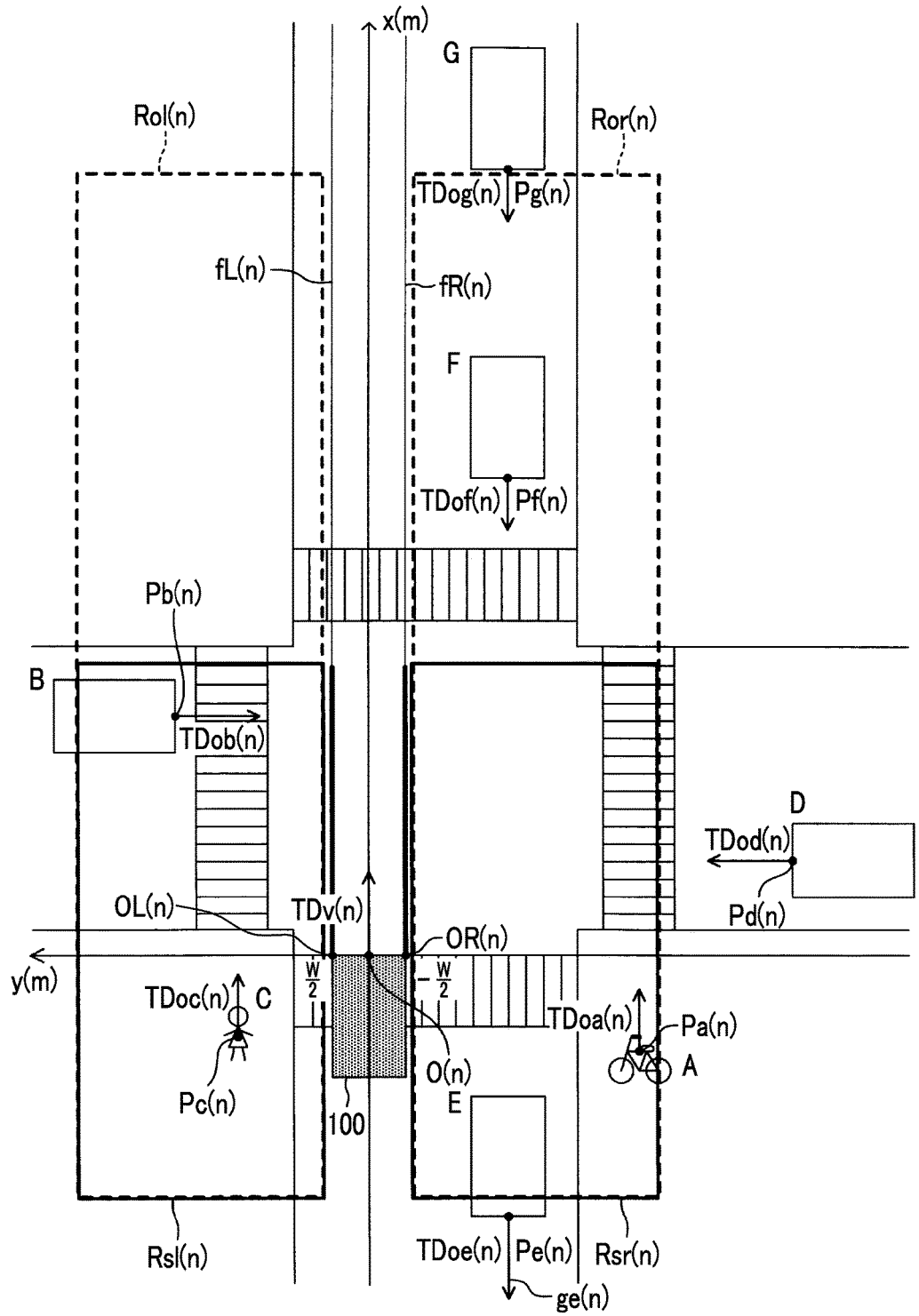
FIG. 7 is a diagram that illustrates a state in which four regions illustrated in FIG. 5 are set around the host vehicle illustrated in FIG. 4, and is used for describing whether or not a traffic situation occurs at the n-th cycle.

In the example in FIG. 7, the object A to the object G move in a direction illustrated by arrows. The objects A, C, E to G move parallel to the x axis, and the object B, D move parallel to the y axis. The driving assistance ECU 10 calculates an angular difference θa(n) to an angular difference θg(n) between the traveling direction TDv(n) of the host vehicle 100 and each of the traveling direction TDoa(n) to the traveling direction TDog(n) of the object A to the object G by using General Formula (13). For example, for the object A, an object velocity vector ba(n) of the object A is ba(n)=(SPDoa(n),0). Thus, when the object velocity vector ba(n) is substituted in General Formula (13), the result is cos θa(n)=1, and angular difference θa(n)=0° is acquired. When the same process is performed for the object B to the object G, θb(n)=θd(n)=90°, θc(n)=0°, and θe(n)=θf(n)=↓g(n)=180° are acquired.

Classification of Objects Based on Angular Difference θ

Based on the angular difference θ(n), the driving assistance ECU 10 determines whether the traveling direction TDo(n) of the object is regarded as approximately the same direction as the traveling direction TDv(n) of the host vehicle 100 for convenience or regarded as an approximately opposite direction to the traveling direction TDv(n) of the host vehicle 100 for convenience. Such a process is a preliminary process for a subsequent process, and is a process of tentatively classifying the object as one of two directions (approximately the same direction and approximately the opposite direction) for convenience based on the traveling direction TDo(n) of the object. Specifically, the driving assistance ECU 10 determines whether or not the angular difference θ(n) is less than or equal to a first angular threshold (90° in the present example). When the driving assistance ECU 10 determines that the angular difference θ(n) is less than or equal to the first angular threshold (that is, when the driving assistance ECU 10 determines that 0°≤θ(n)≤90° is satisfied), the driving assistance ECU 10 determines that the traveling direction TDo(n) of the object is regarded as approximately the same direction as the traveling direction TDv(n) of the host vehicle 100 for convenience (tentatively), and classifies the object as a same direction object that moves in approximately the same direction as the host vehicle 100. When the driving assistance ECU 10 determines that the angular difference θ is greater than the first angular threshold (that is, when the driving assistance ECU 10 determines that 90°≤θ(n)≤180° is satisfied), the driving assistance ECU 10 determines that the traveling direction TDo(n) of the object is regarded as approximately the opposite direction to the traveling direction TDv(n) of the host vehicle 100 for convenience (tentatively), and classifies the object as an opposite direction object that moves in approximately the opposite direction to the host vehicle 100. The driving assistance ECU 10 stores the classification result in the RAM of the driving assistance ECU 10. The first angular threshold is not limited to 90° and may be set to any value that is regarded as approximately 90° (for example, an angle of 85° to 95°).

In the example in FIG. 7, the angular difference θa(n) to the angular difference θd(n) of the object A to the object D are greater than or equal to 0° and less than or equal to 90°. Thus, the driving assistance ECU 10 determines that the traveling direction TDoa(n) to the traveling direction TDod(n) of the object A to the object D are regarded as approximately the same direction as the traveling direction TDv(n) of the host vehicle 100, and classifies the object A to the object D as the same direction object. The angular difference θe(n) to the angular difference θg(n) of the object E to the object G are greater than 90° and less than or equal to 180°. Thus, the driving assistance ECU 10 determines that the traveling direction TDoe(n) to the traveling direction TDog(n) of the object E to the object G are regarded as approximately the opposite direction to the host vehicle 100, and classifies the object E to the object G as the opposite direction object.

Same Direction Region Condition and Opposite Direction Region Condition

When the driving assistance ECU 10 classifies an object as the same direction object, the driving assistance ECU 10 determines whether or not a "same direction region condition that the coordinates of the relative position P(n) of the same direction object are positioned within any region of the left-side same direction region Rsl(n) defined by General Formula (8) and the right-side same direction region Rsr(n) defined by General Formula (9)" is established. When the driving assistance ECU 10 classifies an object as the opposite direction object, the driving assistance ECU 10 determines whether or not an "opposite direction region condition that the coordinates of the relative position P(n) of the opposite direction object are positioned within any region of the left-side opposite direction region Rol(n) defined by General Formula (10) and the right-side opposite direction region Ror(n) defined by General Formula (11)" is established.

When the driving assistance ECU 10 determines that the same direction region condition is established, the driving assistance ECU 10 determines that the same direction object is present in the same direction region Rs(n), and extracts the same direction object as an in-region same direction object. When the driving assistance ECU 10 determines that the same direction region condition is not established, the driving assistance ECU 10 determines that the same direction object is not present in the same direction region Rs(n), and does not extract the same direction object.

When the driving assistance ECU 10 determines that the opposite direction region condition is established, the driving assistance ECU 10 determines that the opposite direction object is present in the opposite direction region Ro(n), and extracts the opposite direction object as an in-region opposite direction object. When the driving assistance ECU 10 determines that the opposite direction region condition is not established, the driving assistance ECU 10 determines that the opposite direction object is not present in the opposite direction region Ro(n), and does not extract the opposite direction object. The driving assistance ECU 10 stores the extraction result in the RAM of the driving assistance ECU 10.

In the example in FIG. 7 where the object A to the object D are classified as the same direction object, the coordinates of the relative position Pa(n) of the object A is within the right-side same direction region Rsr(n) defined by General Formula (9), and the coordinates of the relative position Pb(n) of the object B and the coordinates of the relative position Pc(n) of the object C are within the left-side same direction region Rsl(n) defined by General Formula (8). Accordingly, the driving assistance ECU 10 determines that the same direction region condition is established for the object A to the object C, and extracts the object A to the object C as the in-region same direction object. The coordinates of the relative position Pd(n) of the object D is not within any of the right-side same direction region Rsr(n) and the left-side same direction region Rsl(n). Accordingly, the driving assistance ECU 10 determines that the same direction region condition is not established for the object D, and does not extract the object D.

For the object E to the object G classified as the opposite direction object, the coordinates of the relative position Pe(n) of the object E and the coordinates of the relative position Pf(n) of the object F are within the right-side opposite direction region Ror(n) defined by General Formula (11). Accordingly, the driving assistance ECU 10 determines that the opposite direction region condition is established for the object E and the object F, and extracts the object E and the object F as the in-region opposite direction object. The coordinates of the relative position Pg(n) of the object G is not within any of the left-side opposite direction region Rol(n) defined by General Formula (10) and the right-side opposite direction region Ror(n) defined by General Formula (11). Accordingly, the driving assistance ECU 10 determines that the opposite direction region condition is not established for the object and does not extract the object G.

Same Direction Speed Condition and Opposite Direction Speed Condition

When the driving assistance ECU 10 extracts an object as the in-region same direction object, the driving assistance ECU 10 determines whether or not a same direction speed condition is established. The same direction speed condition is that the speed SPDo(n) of the in-region same direction object is within a same direction speed range (greater than or equal to 5.56 m/s and less than or equal to 27.78 m/s in the present example). When the driving assistance ECU 10 extracts an object as the in-region opposite direction object, the driving assistance ECU 10 determines whether or not an opposite direction speed condition is established. The opposite direction speed condition is that the speed SPDo(n) of the in-region opposite direction object is within an opposite direction speed range (greater than or equal to 2.8 m/s and less than or equal to 27.78 m/s in the present example).

When the driving assistance ECU 10 determines that the same direction speed condition is established, the driving assistance ECU 10 determines that the in-region same direction object is traveling within the same direction speed range, and extracts the in-region same direction object as an "in-region same direction object satisfying the same direction speed condition". When the driving assistance ECU 10 determines that the same direction speed condition is not established, the driving assistance ECU 10 determines that the in-region same direction object is traveling outside the same direction speed range, and does not extract the in-region same direction object.

When the driving assistance ECU 10 determines that the opposite direction speed condition is established, the driving assistance ECU 10 determines that the in-region opposite direction object is traveling within the opposite direction speed range, and extracts the in-region opposite direction object as an "in-region opposite direction object satisfying the opposite direction speed condition". When the driving assistance ECU 10 determines that the opposite direction speed condition is not established, the driving assistance ECU 10 determines that the in-region opposite direction object is traveling outside the opposite direction speed range, and does not extract the in-region opposite direction object. The driving assistance ECU 10 stores the extraction result in the RAM of the driving assistance ECU 10.

In the example in FIG. 7, the speeds SPDo(n) of the object A, the object B, the object C, the object E, and the object F are assumed to be respectively SPDoa(n)=6 m/s, SPDob(n)=8 m/s, SPDoc(n)=1 m/s, SPDoe(n)=15 m/s, and SPDof(n)=12 m/s. In such a case, for the object A to the object C extracted as the in-region same direction object, the speed SPDoa(n) of the object A (6 m/s) and the speed SPDob(n) of the object B (8 m/s) are within the same direction speed range. Accordingly, the driving assistance ECU 10 determines that the same direction speed condition is established for the object A and the object B, and extracts the object A and the object B as the "in-region same direction object satisfying the same direction speed condition". The speed SPDoc(n) of the object C (1 m/s) is outside the same direction speed range. Accordingly, the driving assistance ECU 10 determines that the same direction speed condition is not established for the object C, and does not extract the object C.

For the object E and the object F extracted as the in-region opposite direction object, the speed SPDoe(n) of the object E (15 m/s) and the speed SPDof(n) of the object F (12 m/s) are within the opposite direction speed range. Accordingly, the driving assistance ECU 10 determines that the opposite direction speed condition is established for the object E and the object F, and extracts the object E and the object F as the "in-region opposite direction object satisfying the opposite direction speed condition".

Same Direction Angle Condition and Opposite Direction Angle Condition

The traffic situation that hinders traveling of the target object (that is, an object having a possibility of crossing the expected path of the host vehicle 100 within the threshold time period) is considered as being caused by an object crossing in front of the target object, that is, an object having the traveling direction TDo(n) approximately parallel to the traveling direction TDv(n) of the host vehicle 100. As is apparent from the description of Classification of Objects, an object is classified as any of the same direction object and the opposite direction object based on whether or not the angular difference $\theta(n)$ is less than or equal to the first angular threshold (90° in the present example). Accordingly, the "in-region same direction objects satisfying the same direction speed condition" include an object having the traveling direction TDo(n) not approximately parallel to the traveling direction TDv(n) of the host vehicle 100. Similarly, the "in-region opposite direction objects satisfying the opposite direction speed condition" include an object having the traveling direction TDo(n) not approximately parallel to the traveling direction TDv(n) of the host vehicle 100. Accordingly, when the driving assistance ECU 10 extracts an object as the "in-region same direction object satisfying the same direction speed condition", and when the driving assistance ECU 10 extracts an object as the "in-region opposite direction object satisfying the opposite direction speed condition", the driving assistance ECU 10 determines whether or not the traveling direction TDo(n) of the object is approximately parallel to the traveling direction TDv(n) of the host vehicle 100 based on the angular difference $\theta(n)$.

Specifically, when the driving assistance ECU 10 extracts an object as the "in-region same direction object satisfying the same direction speed condition", the driving assistance ECU 10 determines whether or not a same direction angle condition is established. The same direction angle condition is that the angular difference θ(n) is less than or equal to a second angular threshold (20° in the present example). When the driving assistance ECU 10 determines that the same direction angle condition is established (that is, when 0°≤O(n)≤20° is satisfied), the driving assistance ECU 10 determines that the traveling direction TDo(n) of the object is approximately parallel to the traveling direction TDv(n) of the host vehicle 100, and extracts the object as an "in-region same direction object satisfying the same direction speed condition and the same direction angle condition". When the driving assistance ECU 10 determines that the same direction angle condition is not established (that is, when 20°<θ(n)≤90° is satisfied), the driving assistance ECU 10 determines that the traveling direction TDo(n) of the object is not approximately parallel to the traveling direction TDv(n) of the host vehicle 100, and does not extract the object. The driving assistance ECU 10 stores the extraction result in the RAM of the driving assistance ECU 10. Hereinafter, the "in-region same direction object satisfying the same direction speed condition and the same direction angle condition" will be simply referred to as an "in-region same direction object satisfying the conditions". The second angular threshold is not limited to 20° and may be set to any value smaller than the first angular threshold (for example, a predetermined value within a range of greater than 0° and less than or equal to 45°). As the second angular threshold is smaller, an object having a higher degree of parallelism between the traveling direction TDo(n) and the traveling direction TDv(n) of the host vehicle 100 is extracted.

When the driving assistance ECU 10 extracts an object as the "in-region opposite direction object satisfying the opposite direction speed condition", the driving assistance ECU 10 determines whether or not an opposite direction angle condition is established. The opposite direction angle condition is that the angular difference θ(n) is greater than or equal to a third angular threshold (160° in the present example). When the driving assistance ECU 10 determines that the opposite direction angle condition is established (that is, when 160°≤θ(n)≤180° is satisfied), the driving assistance ECU 10 determines that the traveling direction TDo(n) of the object is approximately parallel to the traveling direction TDv(n) of the host vehicle 100, and extracts the object as an "in-region opposite direction object satisfying the opposite direction speed condition and the opposite direction angle condition". When the driving assistance ECU 10 determines that the opposite direction angle condition is not established (that is, when 90°≤θ(n)<160° is satisfied), the driving assistance ECU 10 determines that the traveling direction TDo(n) of the object is not approximately parallel to the traveling direction TDv(n) of the host vehicle 100, and does not extract the object. The driving assistance ECU 10 stores the extraction result in the RAM of the driving assistance ECU 10. Hereinafter, the "in-region opposite direction object satisfying the opposite direction speed condition and the opposite direction angle condition" will be simply referred to as an "in-region opposite direction object satisfying the conditions". The "in-region same direction object satisfying the conditions" and the "in-region opposite direction object satisfying the conditions" may be collectively referred to as an "in-region object satisfying the conditions". The third angular threshold is not limited to 160° and may be set to any value greater than the first angular threshold (for example, a predetermined value within a range of greater than or equal to 135° and less than 180°). As the third angular threshold is greater, an object having a higher degree of parallelism between the traveling direction TDo(n) and the traveling direction TDv(n) of the host vehicle 100 is extracted.

In the example in FIG. 7 where the object A and the object B are extracted as the "in-region same direction object satisfying the same direction speed condition", the angular difference θa(n) of the object (=0°) is less than or equal to the second angular threshold. Accordingly, the driving assistance ECU 10 determines that the same direction angle condition is established for the object A, and extracts the object A as the "in-region same direction object satisfying the same direction speed condition and the same direction angle condition". The angular difference θb(n) of the object (=90°) is greater than the second angular threshold. Accordingly, the driving assistance ECU 10 determines that the same direction angle condition is not established for the object B, and does not extract the object B.

For the object E and the object F extracted as the "in-region opposite direction object satisfying the opposite direction speed condition", the angular difference θe(n) of the object E (=180°) and the angular difference θf(n) of the object F (=180°) are greater than or equal to the third angular threshold. Accordingly, the driving assistance ECU 10 determines that the opposite direction angle condition is established for the object E and the object F, and extracts the object E and the object F as the "in-region opposite direction object satisfying the opposite direction speed condition and the opposite direction angle condition".

Classification of Objects Based on Relative Position P

A determination as to whether or not traveling of the target object (an object having a possibility of crossing the expected path of the host vehicle 100 within the threshold time period) is hindered is considered to be different according to whether the "in-region object satisfying the conditions" is present on the left side or the right side of the host vehicle 100. That is, for example, when the "in-region object satisfying the conditions" is present on the right side of the host vehicle 100 with the target object approaching from the right side of the host vehicle 100, the "in-region object satisfying the conditions" is present closer to the target object than the host vehicle 100. Accordingly, the target object is unlikely to be considered as crossing the expected path of the host vehicle 100 positioned further than the "in-region object satisfying the conditions" within the threshold time period. That is, traveling of the target object is considered to be hindered by the "in-region object satisfying the conditions". When the "in-region object satisfying the conditions" is present on the left side of the host vehicle 100 with the target object approaching from the right side of the host vehicle 100, the "in-region object satisfying the conditions" is present further than the host vehicle 100 from the target object. Accordingly, the target object has a possibility of crossing the expected path of the host vehicle 100 positioned closer than the "in-region object satisfying the conditions" within the threshold time period. That is, the possibility of traveling of the target object being hindered by the "in-region object satisfying the conditions" is considered to be very low. The same applies when the target object approaches from the left side of the host vehicle 100. Accordingly, when the driving assistance ECU 10 extracts an object as the "in-region object satisfying the conditions", the driving assistance ECU 10 determines whether the object is present on the left side or the right side of the host vehicle 100 and determines whether or not the object may be the cause of hindering traveling of the target object.

Specifically, when the driving assistance ECU 10 extracts an object as the "in-region same direction object satisfying the same direction speed condition and the same direction angle condition", the driving assistance ECU 10 determines whether or not the coordinates of the relative position P(n) are within the left-side same direction region Rsl(n) defined by General Formula (8). When the driving assistance ECU determines that the coordinates of the relative position P(n) are within the left-side same direction region Rsl(n), the driving assistance ECU 10 determines that the object is present on the left side of the host vehicle 100, and classifies the object as a "'left-side' in-region same direction object satisfying the same direction speed condition and the same direction angle condition" (left-side same direction object). When the driving assistance ECU 10 determines that the coordinates of the relative position P(n) of the "in-region same direction object satisfying the same direction speed condition and the same direction angle condition" are not within the left-side same direction region Rsl(n), the driving assistance ECU 10 determines that the coordinates are within the right-side same direction region Rsr(n) defined by General Formula (9) (that is, the object is present on the right side of the host vehicle 100), and classifies the object as a "'right-side' in-region same direction object satisfying the same direction speed condition and the same direction angle condition" (right-side same direction object). The driving assistance ECU 10 stores the classification result in the RAM of the driving assistance ECU 10. Hereinafter, the "'left-side' in-region same direction object satisfying the same direction speed condition and the same direction angle condition" may be simply referred to as a "left-side in-region same direction object satisfying the conditions". The "'right-side' in-region same direction object satisfying the same direction speed condition and the same direction angle condition" may be simply referred to as a "right-side in-region same direction object satisfying the conditions".

When the driving assistance ECU 10 extracts an object as the "in-region opposite direction object satisfying the opposite direction speed condition and the opposite direction angle condition", the driving assistance ECU 10 determines whether or not the coordinates of the relative position P(n) are within the left-side opposite direction region Rol(n) defined by General Formula (10). When the driving assistance ECU determines that the coordinates of the relative position P(n) are within the left-side opposite direction region Rol(n), the driving assistance ECU 10 determines that the object is present on the left side of the host vehicle 100, and classifies the object as a "'left-side' in-region opposite direction object satisfying the opposite direction speed condition and the opposite direction angle condition" (left-side opposite direction object). When the driving assistance ECU 10 determines that the coordinates of the relative position P(n) of the "in-region opposite direction object satisfying the opposite direction speed condition and the opposite direction angle condition" are not within the left-side opposite direction region Rol(n), the driving assistance ECU 10 determines that the coordinates are within the right-side opposite direction region Ror(n) defined by General Formula (11) (that is, the object is present on the right side of the host vehicle 100), and classifies the object as a "'right-side' in-region opposite direction object satisfying the opposite direction speed condition and the opposite direction angle condition" (right-side opposite direction object). The driving assistance ECU 10 stores the classification result in the RAM of the driving assistance ECU 10. Hereinafter, the "'left-side' in-region opposite direction object satisfying the opposite direction speed condition and the opposite direction angle condition" may be simply referred to as a "left-side in-region opposite direction object satisfying the conditions". The "'right-side' in-region opposite direction object satisfying the opposite direction speed condition and the opposite direction angle condition" may be simply referred to as a "right-side in-region opposite direction object satisfying the conditions".

In the example in FIG. 7, the coordinates of the relative position Pa(n) of the object A extracted as the "in-region same direction object satisfying the conditions" are not within the left-side same direction region Rsl(n) defined by General Formula (8). Thus, the driving assistance ECU 10 determines that the object A is present in the right-side same direction region Rsr(n), and classifies the object A as the "'right-side' in-region same direction object satisfying the conditions". The coordinates of the relative position Pe(n) and the relative position Pf(n) of the object E and the object F extracted as the "in-region opposite direction object satisfying the conditions" are not within the left-side opposite direction region Rol(n) defined by General Formula (10). Accordingly, the driving assistance ECU 10 determines that the object E and the object F are present in the right-side opposite direction region Ror(n), and classifies the object E and the object F as the "'right-side' in-region opposite direction object satisfying the conditions".

Counting of Number of Objects

The driving assistance ECU 10 counts the number of "in-region objects satisfying the conditions" being present on the left side of the host vehicle 100 and the number of "in-region objects satisfying the conditions" being present on the right side of the host vehicle 100.

Specifically, the driving assistance ECU 10 counts the number of "left-side in-region same direction objects satisfying the conditions" by a left-side same direction counter ksl and counts the number of "left-side in-region opposite direction objects satisfying the conditions" by a left-side opposite direction counter kol. The driving assistance ECU 10 calculates the total of both of the counted numbers (=ksl+kol) as the number of "in-region objects satisfying the conditions" being present on the left side of the host vehicle 100 (hereinafter, the number will be referred to as a "left-side object number"). Hereinafter, the "'in-region object satisfying the conditions' being present on the left side of the host vehicle 100" will be referred to as a "left-side in-region object satisfying the conditions".

The driving assistance ECU 10 counts the number of "right-side in-region same direction objects satisfying the conditions" by a right-side same direction counter ksr and counts the number of "right-side in-region opposite direction objects satisfying the conditions" by a right-side opposite direction counter kor. The driving assistance ECU 10 calculates the total of both of the counted numbers (=ksr+kor) as the number of "in-region objects satisfying the conditions" being present on the right side of the host vehicle 100 (hereinafter, the number will be referred to as a "right-side object number"). Hereinafter, the "'in-region object satisfying the condition' being present on the right side of the host vehicle 100" will be referred to as a "right-side in-region object satisfying the conditions". The driving assistance ECU 10 stores the left-side object number and the right-side object number in the RAM of the driving assistance ECU 10.

In the example in FIG. 7, as described above, an object that is classified as the "left-side in-region same direction object satisfying the conditions" is not present at the n-th cycle and thus, is zero in number. Similarly, an object that is classified as the "left-side in-region opposite direction object satisfying the conditions" is not present at the n-th cycle and thus, is zero in number. Accordingly, the number of "left-side in-region objects satisfying the conditions"

(left-side object number) calculated by the driving assistance ECU 10 is "0" which is the total of both of the counted numbers. The object A is classified as the "right-side in-region same direction object satisfying the conditions" at the n-th cycle and thus, is one in number. The object E and the object F are classified as the "right-side in-region opposite direction object satisfying the conditions" at the n-th cycle and thus, are two in number. Accordingly, the number of "right-side in-region objects satisfying the conditions" (right-side object number) calculated by the driving assistance ECU 10 is "3" which is the total of both of the counted numbers.

Calculation of Total Left-Side Object Number and Total Right-Side Object Number

The driving assistance ECU 10 calculates the total of the left-side object number in a predetermined period (hereinafter, referred to as a "total left-side object number") and the total of the right-side object number in the predetermined period (hereinafter, referred to as a "total right-side object number"). When the predetermined period is defined as a period corresponding to M (M is a positive integer) cycles (that is, M×Tcal [s]), the driving assistance ECU 10 calculates the total of recently acquired M left-side object numbers including the left-side object number acquired at the most recent cycle as the total left-side object number. The driving assistance ECU 10 calculates the total of recently acquired M right-side object numbers including the right-side object number acquired at the most recent cycle as the total right-side object number. Before elapse of the predetermined period from the time of switching the engine switch into the ON state, the driving assistance ECU 10 calculates the total of the left-side object number acquired before the current cycle from the time of switching the engine switch into the ON state as the total left-side object number, and calculates the total of the right-side object number acquired before the current cycle from the time of switching the engine switch into the ON state as the total right-side object number.

In the example in FIG. 7, when M=5 is assumed, the predetermined period is a period corresponding to five cycles from an (n−4)-th cycle to the n-th cycle. The object A is assumed to be classified as the "right-side in-region same direction object satisfying the conditions" from the (n−1)-th cycle to the n-th cycle. The object E is assumed to be classified as the "right-side in-region opposite direction object satisfying the conditions" from the (n−4)-th cycle to the n-th cycle. The object F is assumed to be classified as the "right-side in-region opposite direction object satisfying the conditions" from the (n−2)-th cycle to the n-th cycle. During the predetermined period, no object other than the objects A, B, E is assumed to be classified as the "right-side in-region object satisfying the conditions" and the "left-side in-region object satisfying the conditions".

According to the assumption, any of the number of "left-side in-region same direction objects satisfying the conditions" and the number of "left-side in-region opposite direction objects satisfying the conditions" is zero, zero, zero, zero, and zero in order from the (n−4)-th cycle to the n-th cycle. Accordingly, the left-side object number is zero, zero, zero, zero, and zero in order. Therefore, the driving assistance ECU 10 calculates the total of the left-side object number (that is, zero) as the total left-side object number. According to the assumption, the number of "right-side in-region same direction objects satisfying the conditions" is zero, zero, zero, one, and one in order from the (n−4)-th cycle to the n-th cycle. The number of "right-side in-region opposite direction objects satisfying the conditions" is one, one, two, two, and two in order from the (n−4)-th cycle to the n-th cycle. Accordingly, the right-side object number is one, one, two, three, and three in order. Therefore, the driving assistance ECU 10 calculates the total of the right-side object number (that is, 10) as the total right-side object number.

Determination as to Whether or not Left-Side/Right-Side Traffic Situation Occurs and Setting of Left-Side/Right-Side Traffic Situation Flag The driving assistance ECU 10 determines whether or not the total left-side object number is greater than or equal to a predetermined left-side threshold. When the driving assistance ECU 10 determines that the total left-side object number is greater than or equal to the left-side threshold, the driving assistance ECU 10 determines that a "situation in which the "left-side in-region object satisfying the conditions" hinders traveling of the target object approaching from the left side of the host vehicle 100 (hereinafter, the situation will be referred to as a "left-side traffic situation")" occurs, and sets the value of a left-side traffic situation flag to 1. When the driving assistance ECU 10 determines that the total left-side object number is less than the left-side threshold, the driving assistance ECU 10 determines that the left-side traffic situation does not occur, and sets the value of the left-side traffic situation flag to 0.

The driving assistance ECU 10 determines whether or not the total right-side object number is greater than or equal to a predetermined right-side threshold. When the driving assistance ECU 10 determines that the total right-side object number is greater than or equal to the right-side threshold, the driving assistance ECU 10 determines that a "situation in which the "right-side in-region object satisfying the conditions" hinders traveling of the target object approaching from the right side of the host vehicle 100 (hereinafter, the situation will be referred to as a "right-side traffic situation")" occurs, and sets the value of a right-side traffic situation flag to 1. When the driving assistance ECU 10 determines that the total right-side object number is less than the right-side threshold, the driving assistance ECU 10 determines that the right-side traffic situation does not occur, and sets the value of the right-side traffic situation flag to 0. The driving assistance ECU 10 retains the set value of each of the left-side traffic situation flag and the right-side traffic situation flag in the RAM of the driving assistance ECU 10.

In the example in FIG. 7, each of the left-side threshold and the right-side threshold is assumed to be five. According to the assumption, since the total left-side object number is zero, the driving assistance ECU 10 determines that the total left-side object number is less than the left-side threshold, and sets the value of the left-side traffic situation flag to 0. Since the total right-side object number is 10, the driving assistance ECU 10 determines that the total right-side object number is greater than or equal to the right-side threshold, and sets the value of the right-side traffic situation flag to 1.

D. Operation Related to Attention Calling Determination

Next, operation related to an attention calling determination will be described. In the engine ON period, or each time the calculation time period Tcal elapses, the driving assistance ECU 10 determines whether or not attention needs to be called for each object based on the determination result of the target object determination in B (that is, the values of the left-side attention calling flag and the right-side attention calling flag) and the determination result of the traffic situation determination in C (that is, the values of the left-side traffic situation flag and the right-side traffic situation flag).

When Attention is Called

Specifically, when the driving assistance ECU 10 determines that the value of the left-side attention calling flag of an object is 1 (that is, the value of the right-side attention calling flag of the object is 0) and the value of the left-side traffic situation flag is 0, the driving assistance ECU 10 determines that "a target object approaching from the left-side of the host vehicle 100 is present, the target object moves without hindrance to traveling thereof since a traffic situation hindering traveling of the target object does not occur on the left side of the host vehicle 100, and consequently, the target object has a possibility of crossing the left-side expected path of the host vehicle 100 within the threshold time period" regardless of the value of the right-side traffic situation flag. The driving assistance ECU 10 generates the request signal and calls attention to the target object by using the display device 21. That is, when a target object approaching from the left side of the host vehicle 100 is present and the left-side traffic situation does not occur, the driving assistance ECU 10 calls attention even when the right-side traffic situation occurs. When the driving assistance ECU 10 determines that the value of the right-side attention calling flag of an object is 1 (that is, the value of the left-side attention calling flag of the object is 0) and the value of the right-side traffic situation flag is 0, the driving assistance ECU 10 determines that "a target object approaching from the right-side of the host vehicle 100 is present, the target object moves without hindrance to traveling thereof since a traffic situation hindering traveling of the target object does not occur on the right side of the host vehicle 100, and consequently, the target object has a possibility of crossing the right-side expected path of the host vehicle 100 within the threshold time period" regardless of the value of the left-side traffic situation flag. The driving assistance ECU 10 generates the request signal and calls attention to the target object by using the display device 21. That is, when a target object approaching from the right side of the host vehicle 100 is present and the right-side traffic situation does not occur, the driving assistance ECU 10 calls attention even when the left-side traffic situation occurs.

When Attention Calling is Forbidden

When the driving assistance ECU 10 determines that the value of the left-side attention calling flag of an object is 1 and the value of the left-side traffic situation flag is 1, the driving assistance ECU 10 determines that "while a target object approaching from the left side of the host vehicle 100 is present, traveling of the target object is hindered by the left-side traffic situation, and consequently, the target object has a very low possibility of crossing the left-side expected path of the host vehicle 100 within the threshold time period" regardless of the value of the right-side traffic situation flag. The driving assistance ECU 10 forbids generation of the request signal and accordingly, forbids calling attention to the target object. That is, when a target object approaching from the left side of the host vehicle 100 is present and the left-side traffic situation occurs, the driving assistance ECU 10 forbids attention calling even when the right-side traffic situation does not occur. When the driving assistance ECU 10 determines that the value of the right-side attention calling flag of an object is 1 and the value of the right-side traffic situation flag is 1, the driving assistance ECU 10 determines that "while a target object approaching from the right side of the host vehicle 100 is present, traveling of the target object is hindered by the right-side traffic situation, and consequently, the target object has a very low possibility of crossing the right-side expected path of the host vehicle 100 within the threshold time period" regardless of the value of the left-side traffic situation flag. The driving assistance ECU 10 forbids generation of the request signal and accordingly, forbids calling attention to the target object. That is, when a target object approaching from the right side of the host vehicle 100 is present and the right-side traffic situation occurs, the driving assistance ECU 10 forbids attention calling even when the left-side traffic situation does not occur.

When Attention is not Called

When the driving assistance ECU 10 determines that the values of the left-side attention calling flag and the right-side attention calling flag of an object are 0, the driving assistance ECU 10 determines that the target object is not present (that is, the object is not the target object) regardless of the values of the left-side traffic situation flag and the right-side traffic situation flag. The driving assistance ECU 10 does not generate the request signal and accordingly, does not call attention.

Specific Operation of First Embodied Apparatus

Next, specific operation of the first embodied apparatus will be described. The CPU of the driving assistance ECU 10 of the first embodied apparatus executes routines illustrated in flowcharts in FIG. 8 to FIG. 11 each time the calculation time period Tcal elapses. The routines are performed when the driving assistance ECU 10 determines that the host vehicle 100 is traveling straight. A determination as to whether or not the host vehicle 100 is traveling straight can be performed based on any of, for example, the difference between the wheel speed WS(n) of the left front wheel and the wheel speed WS(n) of the right front wheel, the yaw rate Y(n), a steering angle, and a horizontal acceleration. Hereinafter, the routines at the n-th cycle (n≥M) will be described. Hereinafter, the CPU of the driving assistance ECU 10 will be simply referred to as a "CPU".

When a predetermined timing arrives, the CPU starts from a process of step 800 in FIG. 8 and performs processes of step 802 to step 808 described below in order.

Step 802: The CPU acquires the host vehicle information (the vehicle speed SPDv(n), the yaw rate Y(n), and the like) as described above and stores the host vehicle information in the RAM of the driving assistance ECU 10.

Step 804: The CPU determines the traveling direction TDv(n) of the host vehicle 100 based on the host vehicle information acquired in step 802. The CPU sets the coordinate axes (the x axis and the y axis) as described above and stores information representing the coordinate axes in the RAM of the driving assistance ECU 10.

Step 806: Based on the host vehicle information acquired in step 802, the CPU acquires the vehicle velocity vector a(n) in the xy coordinate plane configured by the coordinate axes set in step 804 and stores the vehicle velocity vector a(n) in the RAM of the driving assistance ECU 10.

Step 808: The CPU acquires the object information of an object (the coordinates of the relative position P(n) and the velocity vector b(n) (the speed SPDo(n) and the traveling direction TDo(n)) of the object) being present around the host vehicle 100 as described above and stores the object information in the RAM of the driving assistance ECU 10 (refer to General Formula (4) and General Formula (5)).

Next, the CPU transitions to step 810 and performs the target object determination process. Next, the CPU transitions to step 812 and performs the left-side/right-side traffic situation determination process. The CPU may perform the process of step 810 after performing the process of step 812, or may perform the process of step 812 along with the process of step 810.

Figure 8:
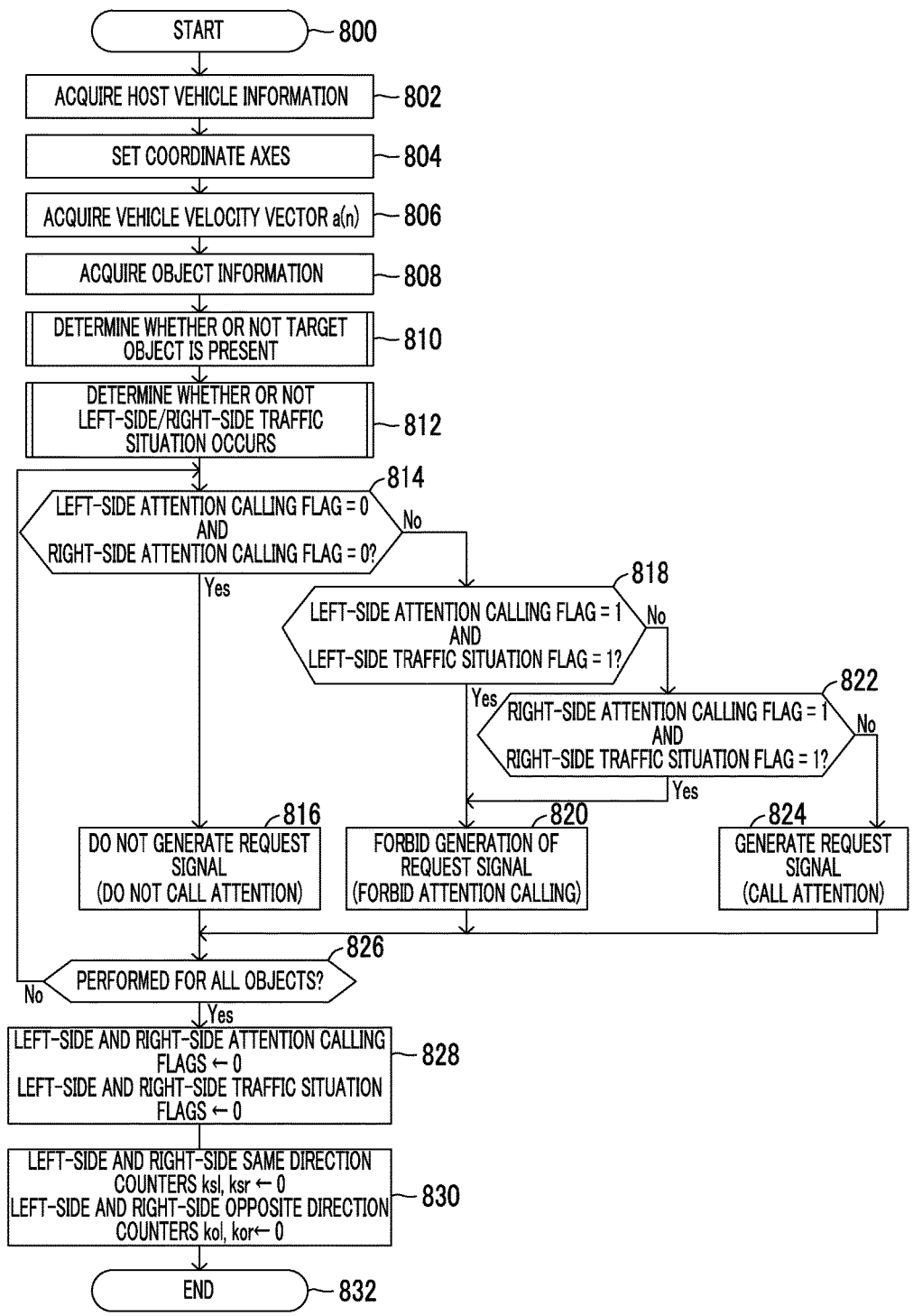
FIG. 8 is a flowchart (1) illustrating a routine executed by a CPU of a driving assistance ECU of the first embodied apparatus (hereinafter, referred to as a "CPU of the first embodied apparatus")
Figure 9:
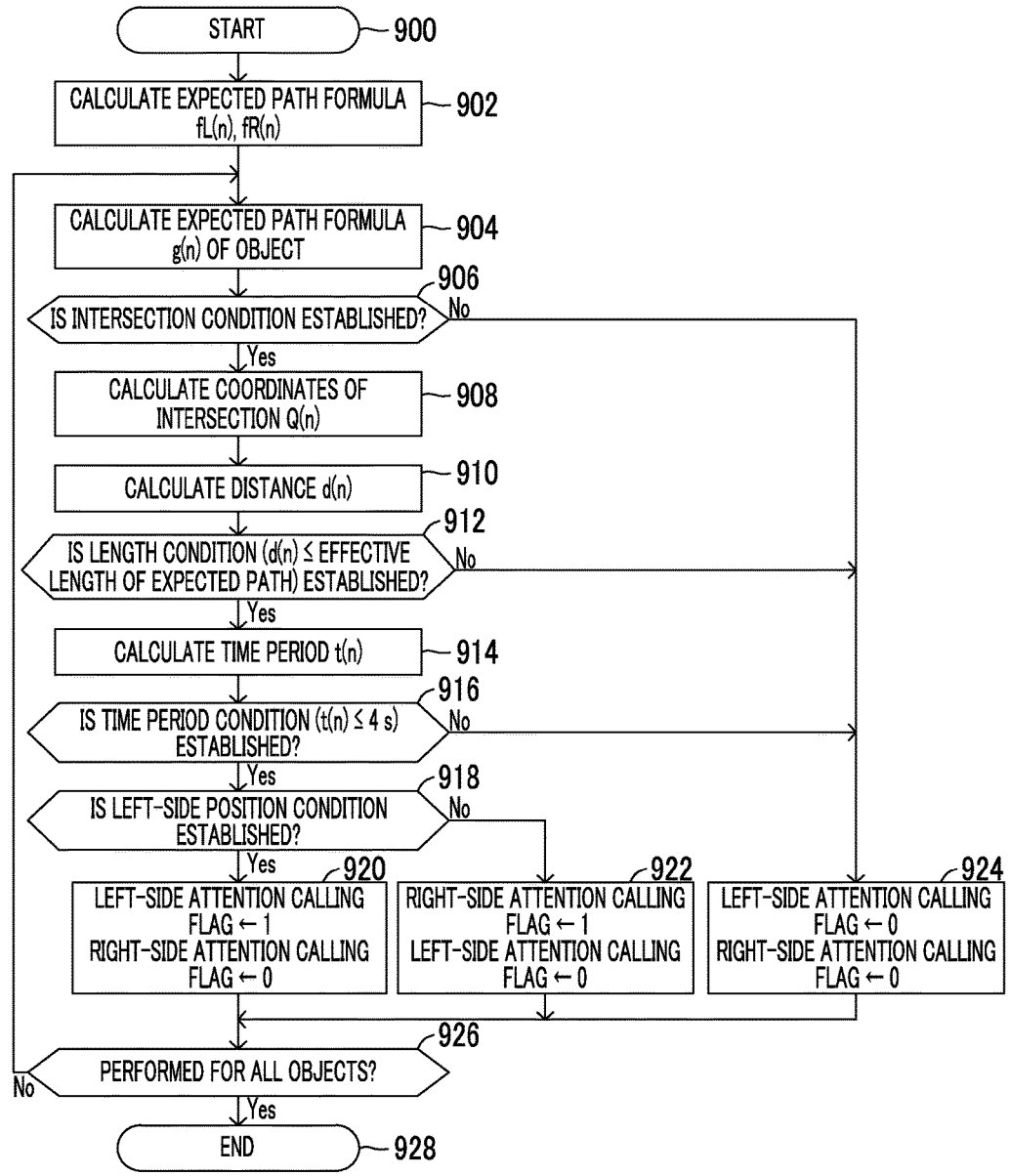
FIG. 9 is a flowchart (2) illustrating a routine executed by the CPU of the first embodied apparatus.

In the routine in FIG. 8, the CPU in step 810 executes the routine illustrated in the flowchart in FIG. 9. When the CPU transitions to step 810, the CPU starts from a process of step 900 in FIG. 9 and performs processes of step 902 and step 904 below in order.

Step 902: The CPU calculates the left-side expected path formula fL(n) and the right-side expected path formula fR(n) of the host vehicle 100 in the xy coordinate plane and stores the left-side expected path formula fL(n) and the right-side expected path formula fR(n) in the RAM of the driving assistance ECU 10 (refer to General Formula (6) and General Formula (7)).

Step 904: The CPU selects any one object based on the object information acquired in step 808, calculates the expected path formula g(n) of the selected object in the xy coordinate plane, and stores the expected path formula g(n) in the RAM of the driving assistance ECU 10. The processes of step 904 to step 924 described below are performed for each selected object.

Next, the CPU transitions to step 906 and determines, by using the formula g(n) calculated in step 904, whether or not the intersection condition is established for the object. When the CPU determines that the intersection condition is established, the CPU makes a "Yes" determination in step 906 and performs processes of step 908 and step 910 below in order.

Step 908: The CPU calculates the coordinates of the intersection Q(n) at which the line represented by the formula g(n) intersects first with one of the lines represented by the left-side expected path formula fL(n) and the right-side expected path formula fR(n), and stores the coordinates of the intersection Q(n) in the RAM of the driving assistance ECU 10.

Step 910: The CPU calculates the distance d(n) from the host vehicle 100 to the intersection Q(n) calculated in step 908 and stores the distance d(n) in the RAM of the driving assistance ECU 10.

Next, the CPU transitions to step 912 and determines, by using the distance d(n) calculated in step 910, whether or not the length condition (d(n)≤length of expected path (7 m in the present example)) is established for the object for which the CPU in step 906 determines that the intersection condition is established. When the CPU determines that the length condition is established, the CPU makes a "Yes" determination in step 912 and performs a process of step 914 below.

Step 914: The CPU calculates, as described above, the time period t(n) in which the object is expected to reach the intersection Q(n), and stores the time period t(n) in the RAM of the driving assistance ECU 10.

Next, the CPU transitions to step 916. The CPU determines, by using the time period t(n) calculated in step 914, whether or not the time period condition (t(n)≤threshold time period (4 s in the present example)) is established for the object for which the CPU in step 912 determines that the length condition is established. When the CPU determines that the time period condition is established, the CPU makes a "Yes" determination in step 916 and transitions to step 918 below.

In step 918, the CPU determines whether or not the left-side position condition (the y coordinate of the relative position P(n) of the object is greater than or equal to w/2) is established for the object for which the CPU in step 916 determines that the time period condition is established.

When the CPU determines that the left-side position condition is established, the CPU determines that the object approaches from the left side of the host vehicle 100 (in other words, the CPU determines that the object has a possibility of crossing the left-side expected path within the threshold time period). The CPU makes a "Yes" determination in step 918 and performs a process of step 920 below.

Step 920: The CPU sets the value of the left-side attention calling flag to 1 and sets the value of the right-side attention calling flag to 0 for the object, and stores the set values of the left-side attention calling flag and the right-side attention calling flag in the RAM of the driving assistance ECU 10 in association with the object. Then, the CPU transitions to step 926 described below. The left-side attention calling flag and the right-side attention calling flag are provided for each object (each object selected in step 904).

When the CPU determines that the left-side position condition is established for the object for which the CPU in step 916 determines that the time period condition is established, the CPU determines that the object approaches from the right side of the host vehicle 100 (in other words, the CPU determines that the object has a possibility of crossing the right-side expected path within the threshold time period). The CPU makes a "No" determination in step 918 and performs a process of step 922 below.

Step 922: The CPU sets the value of the right-side attention calling flag to 1 and sets the value of the left-side attention calling flag to 0 for the object, and stores the set values of the right-side attention calling flag and the left-side attention calling flag in the RAM of the driving assistance ECU 10 in association with the object. Then, the CPU transitions to step 926 described below.

When the CPU in step 906 determines that the intersection condition is not established, when the CPU in step 912 determines that the length condition is not established, or when the CPU in step 916 determines that the time period condition is not established, the CPU determines that the object selected in step 904 does not approach from any of the left side and the right side of the host vehicle 100 (in other words, the CPU determines that the object has a very low possibility of crossing each expected path within the threshold time period). The CPU makes a "No" determination in step 906, step 912, or step 916 and transitions to step 924 below.

Step 924: The CPU sets the value of the left-side attention calling flag and the value of the right-side attention calling flag to 0 for the object and stores the set values of the left-side attention calling flag and the right-side attention calling flag in the RAM of the driving assistance ECU 10 in association with the object. Then, the CPU transitions to step 926 below.

In step 926, the CPU determines whether or not the processes from step 904 described above are executed for all objects having the object information acquired in step 808 in FIG. 8. When the CPU determines that the processes described above are not yet executed for all objects, the CPU makes a "No" determination in step 926, returns to step 904, and repeats the processes from step 904 for the remaining objects. When the CPU determines that the processes described above are executed for all objects, the CPU makes a "Yes" determination in step 926 and transitions to step 812 in FIG. 8 through step 928.

Figure 10:
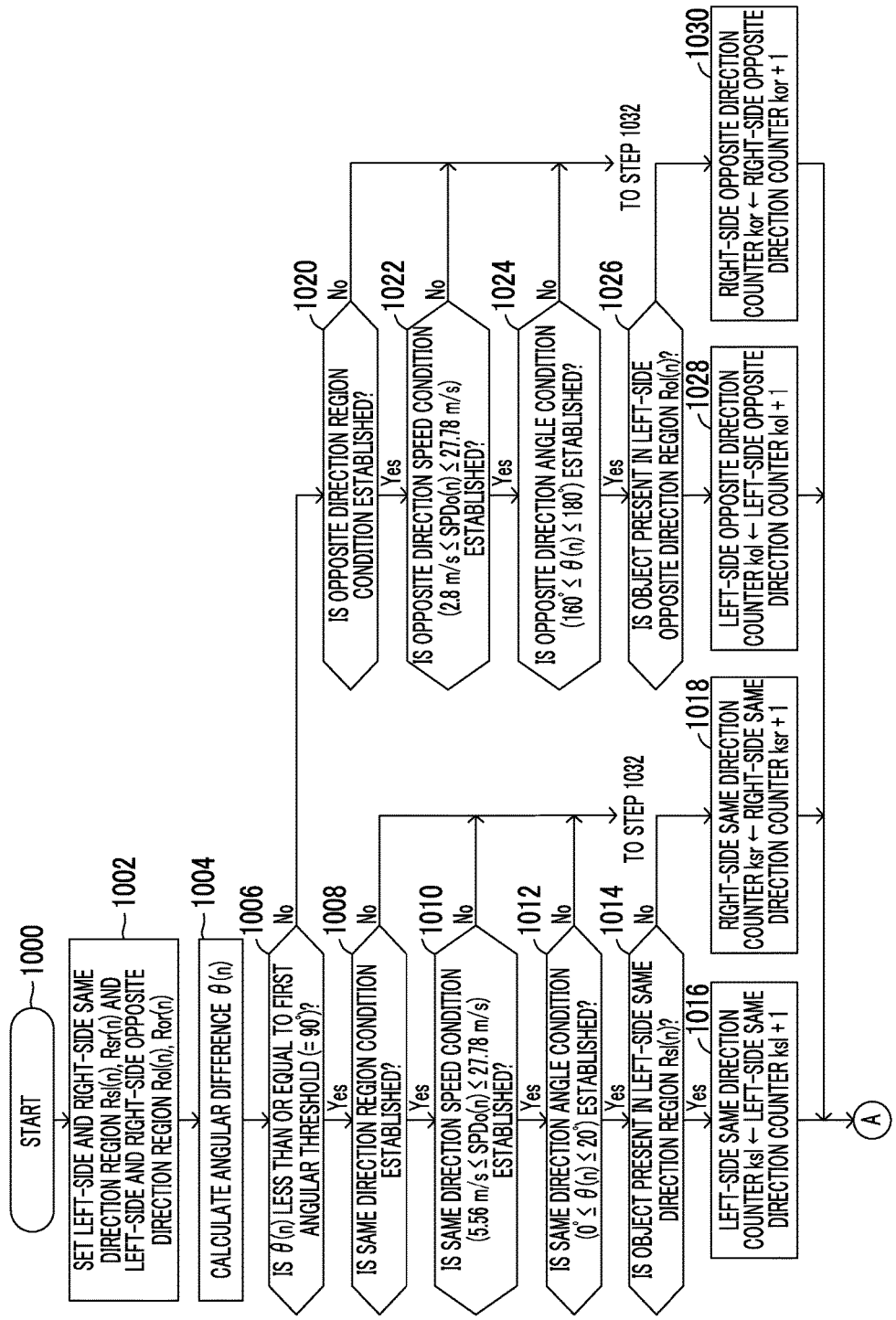
FIG. 10 is a flowchart (3) illustrating a routine executed by the CPU of the first embodied apparatus.
Figure 11:
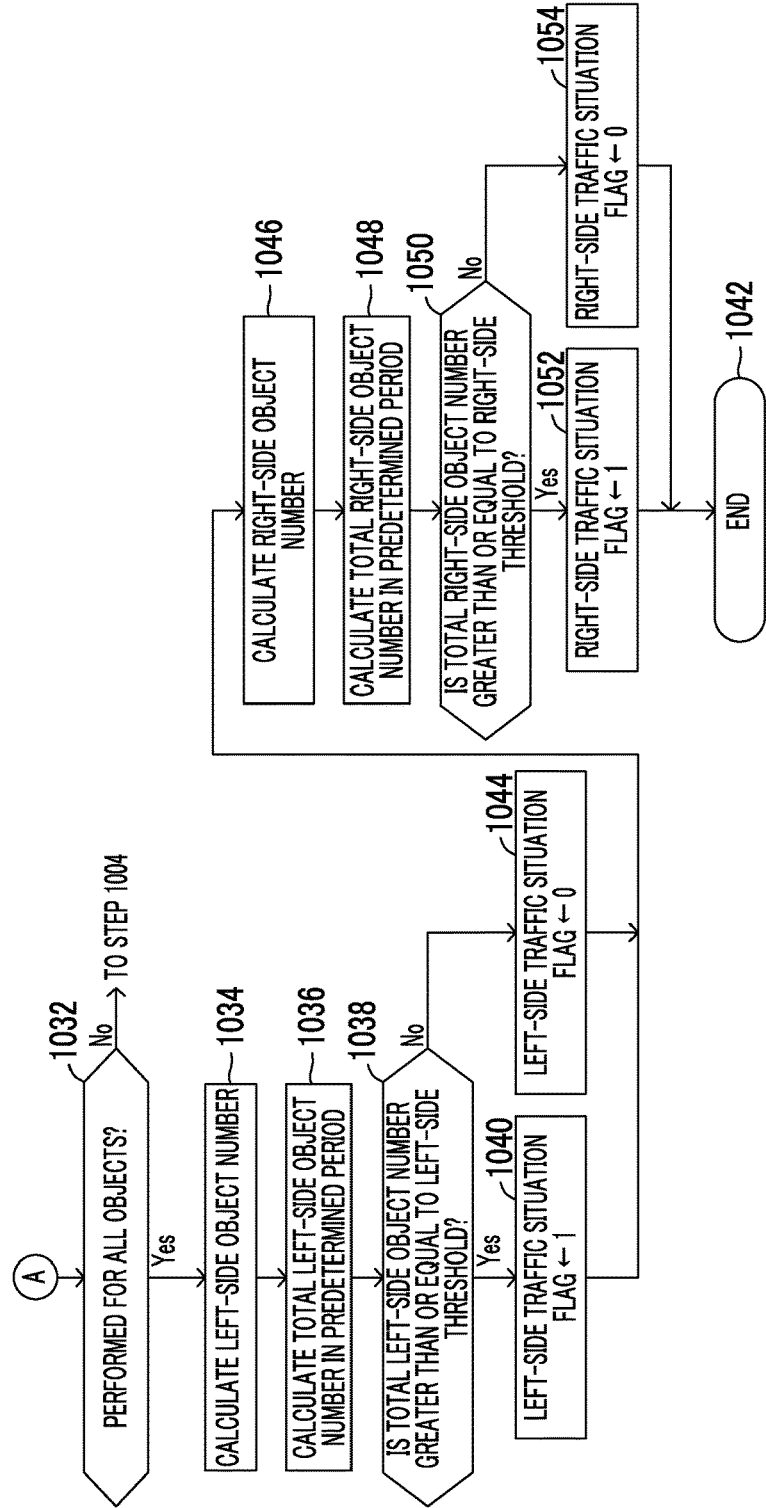
FIG. 11 is a flowchart (4) illustrating a routine executed by the CPU of the first embodied apparatus.

In the routine in FIG. 8, the CPU in step 812 executes the routines illustrated in the flowcharts in FIG. 10 and FIG. 11. When the CPU transitions to step 812, the CPU starts from a process of step 1000 in FIG. 10 and performs processes of step 1002 and step 1004 described below in order.

Step 1002: The CPU sets the left-side same direction region Rsl(n), the right-side same direction region Rsr(n), the left-side opposite direction region Rol(n), and the right-side opposite direction region Ror(n) on the xy coordinate plane as described above (refer to General Formula (8) and General Formula (11)).

Step 1004: The CPU selects any one object from the objects having the object information acquired in step 808. The CPU calculates the angular difference θ(n) (0°≤θ(n)≤180°) between the traveling direction TDv(n) of the host vehicle 100 and the traveling direction TDo(n) of the selected object based on the vehicle velocity vector a(n) acquired in step 806 in FIG. 8 and the object velocity vector b(n) of the selected object acquired in step 808. The CPU stores the angular difference θ(n) in the RAM of the driving assistance ECU 10 in association with the selected object. The processes of step 1004 to step 1030 described below are performed for each selected object.

Next, the CPU transitions to step 1006 and determines whether or not the angular difference θ(n) calculated in step 1004 is less than or equal to the first angular threshold (90° in the present example). When the CPU determines that the angular difference θ(n) is less than or equal to the first angular threshold (that is, when 0°≤θ(n)≤90° is satisfied), the CPU makes a "Yes" determination in step 1006 and transitions to step 1008 below.

In step 1008, the CPU determines whether or not the same direction region condition (the coordinates of the relative position P(n) of the same direction object satisfy General Formula (8) or General Formula (9)) is established for the object for which the CPU in step 1006 determines that the angular difference θ(n) is less than or equal to the first angular threshold (same direction object). When the CPU determines that the same direction region condition is established, the CPU makes a "Yes" determination in step 1008 and transitions to step 1010 below.

In step 1010, the CPU determines whether or not the speed SPDo(n) satisfies the same direction speed condition (5.56≤SPDo(n)≤27.78 in the present example) for the object for which the CPU in step 1008 determines that the same direction region condition is established (in-region same direction object). When the CPU determines that the same direction speed condition is established, the CPU makes a "Yes" determination in step 1010 and transitions to step 1012 below.

In step 1012, the CPU determines whether or not the same direction angle condition (0°≤θ(n)≤20°) that the angular difference θ(n) calculated in step 1004 is less than or equal to the second angular threshold (20° in the present example) is established for the object for which the CPU in step 1010 determines that the same direction speed condition is established (the in-region same direction object satisfying the same direction speed condition). When the CPU determines that the same direction angle condition is established, the CPU makes a "Yes" determination in step 1012 and transitions to step 1014 below.

In step 1014, the CPU determines whether or not the coordinates of the relative position P(n) of the object for which the CPU in step 1012 determines that the same direction angle condition is established (the in-region same direction object satisfying the conditions) satisfy General Formula (8). When the CPU determines that General Formula (8) is satisfied, the CPU makes a "Yes" determination in step 1014 (that is, determines that the object is present in the left-side same direction region Rsl(n)) and performs a process of step 1016 below.

Step 1016: The CPU increases the value of the left-side same direction counter ksl by one and stores the value in the RAM of the driving assistance ECU 10. Then, the CPU transitions to step 1032 described below.

When the CPU determines that the coordinates of the relative position P(n) of the object for which the CPU in step 1012 determines that the same direction angle condition is established (the in-region same direction object satisfying the conditions) do not satisfy General Formula (8), the CPU makes a "No" determination in step 1014 (that is, determines that the object is present in the right-side same direction region Rsr(n)) and performs a process of step 1018 below.

Step 1018: The CPU increases the value of the right-side same direction counter ksr by one and stores the value in the RAM of the driving assistance ECU 10. Then, the CPU transitions to step 1032 described below.

When the CPU in step 1008 determines that the same direction region condition is not established, when the CPU in step 1010 determines that the same direction speed condition is not established, or when the CPU in step 1012 determines that the same direction angle condition is not established, the CPU makes a "No" determination in step 1008, step 1010, or step 1012 and transitions to step 1032 described below.

When the CPU determines that the angular difference θ(n) calculated in step 1004 is greater than the first angular threshold (90° in the present example) (that is, when 90°<θ(n)≤180° is satisfied), the CPU makes a "No" determination in step 1006 and transitions to step 1020 below.

In step 1020, the CPU determines whether or not the opposite direction region condition (the coordinates of the relative position P(n) of the opposite direction object satisfy General Formula (10) or General Formula (11)) is established for the object for which the CPU in step 1006 determines that the angular difference θ(n) is greater than the first angular threshold (opposite direction object). When the CPU determines that the opposite direction region condition is established, the CPU makes a "Yes" determination in step 1020 and transitions to step 1022 below.

In step 1022, the CPU determines whether or not the speed SPDo(n) satisfies the opposite direction speed condition (2.8≤SPDo(n)≤27.78 in the present example) for the object for which the CPU in step 1020 determines that the opposite direction region condition is established (in-region opposite direction object). When the CPU determines that the opposite direction speed condition is established, the CPU makes a "Yes" determination in step 1022 and transitions to step 1024 below.

In step 1024, the CPU determines whether or not the opposite direction angle condition (160°≤θ(n)≤180°) that the angular difference θ(n) calculated in step 1004 is greater than or equal to the third angular threshold (160° in the present example) is established for the object for which the CPU in step 1022 determines that the opposite direction speed condition is established (the in-region opposite direction object satisfying the opposite direction speed condition). When the CPU determines that the opposite direction angle condition is established, the CPU makes a "Yes" determination in step 1024 and transitions to step 1026 below.

In step 1026, the CPU determines whether or not the coordinates of the relative position P(n) of the object for which the CPU in step 1024 determines that the opposite direction angle condition is established (the in-region opposite direction object satisfying the conditions) satisfy General Formula (10). When the CPU determines that General Formula (10) is satisfied, the CPU makes a "Yes" determination in step 1026 (that is, determines that the object is present in the left-side opposite direction region Rol(n)) and performs a process of step 1028 below.

Step 1028: The CPU increases the value of the left-side opposite direction counter kol by one and stores the value in the RAM of the driving assistance ECU 10. Then, the CPU transitions to step 1032 described below.

When the CPU determines that the coordinates of the relative position P(n) of the object for which the CPU in step 1024 determines that the opposite direction angle condition is established (the in-region opposite direction object satisfying the conditions) do not satisfy General Formula (10), the CPU makes a "No" determination in step 1026 (that is, determines that the object is present in the right-side opposite direction region Ror(n)) and performs a process of step 1030 below.

Step 1030: The CPU increases the value of the right-side opposite direction counter kor by one and stores the value in the RAM of the driving assistance ECU 10. Then, the CPU transitions to step 1032 described below.

When the CPU in step 1020 determines that the opposite direction region condition is not established, when the CPU in step 1022 determines that the opposite direction speed condition is not established, or when the CPU in step 1024 determines that the opposite direction angle condition is not established, the CPU makes a "No" determination in step 1020, step 1022, or step 1024 and transitions to step 1032 below.

In step 1032 (refer to FIG. 11), the CPU determines whether or not the processes from step 1004 described above are executed for all objects having the object information acquired in step 808 in FIG. 8. When the CPU determines that the processes described above are not yet executed for all objects, the CPU makes a "No" determination in step 1032, returns to step 1004 in FIG. 10, and repeats the processes from step 1004 for the remaining objects. When the CPU determines that the processes described above are executed for all objects, the CPU makes a "Yes" determination in step 1032 and transitions to step 1034 below.

Step 1034: The CPU calculates the left-side object number (that is, the number of left-side in-region objects satisfying the conditions at the n-th cycle) from the total of the value of the left-side same direction counter ksl in step 1016 and the value of the left-side opposite direction counter kol in step 1028, and stores the value of the left-side object number in the RAM of the driving assistance ECU 10. Then, the CPU performs a process of step 1036.

Step 1036: The CPU calculates the total left-side object number by adding the left-side object number at the n-th cycle calculated in step 1034 to the total of recently acquired (M−1) left-side object numbers (that is, the total of the left-side object number from the (n−4)-th cycle to the (n−1)-th cycle), and stores the total left-side object number in the RAM of the driving assistance ECU 10.

Next, the CPU transitions to step 1038 and determines whether or not the total left-side object number calculated in step 1036 is greater than or equal to the left-side threshold. When the total left-side object number is greater than or equal to the left-side threshold, the CPU determines that the left-side traffic situation occurs. In such a case, the CPU makes a "Yes" determination in step 1038 and performs a process of step 1040 below.

Step 1040: The CPU sets the value of the left-side traffic situation flag to 1 and stores the value in the RAM of the driving assistance ECU 10. Then, the CPU transitions to step 1046.

When the CPU determines that the total left-side object number is less than the left-side threshold, the CPU determines that the left-side traffic situation does not occur, makes a "No" determination in step 1038, and performs a process of step 1044 below.

Step 1044: The CPU sets the value of the left-side traffic situation flag to 0 and stores the value in the RAM of the driving assistance ECU 10. Then, the CPU transitions to step 1046.

Step 1046: The CPU calculates the right-side object number (that is, the number of right-side in-region objects satisfying the conditions at the n-th cycle) from the total of the value of the right-side same direction counter ksr in step 1018 and the value of the right-side opposite direction counter kor in step 1030, and stores the value of the right-side object number in the RAM of the driving assistance ECU 10. Then, the CPU transitions to step 1048.

Step 1048: The CPU calculates the total right-side object number by adding the right-side object number at the n-th cycle calculated in step 1046 to the total of recently acquired (M−1) right-side object numbers (that is, the total of the right-side object number from the (n−4)-th cycle to the (n−1)-th cycle), and stores the value of the total right-side object number in the RAM of the driving assistance ECU 10.

Next, the CPU transitions to step 1050 and determines whether or not the total right-side object number calculated in step 1048 is greater than or equal to the right-side threshold. When the CPU determines that the total right-side object number is greater than or equal to the right-side threshold, the CPU determines that the right-side traffic situation occurs, makes a "Yes" determination in step 1050, and performs a process of step 1052 below.

Step 1052: The CPU sets the value of the right-side traffic situation flag to 1 and stores the value in the RAM of the driving assistance ECU 10. Then, the CPU transitions to step 814 in FIG. 8 through step 1042.

When the CPU determines that the total right-side object number is less than the right-side threshold, the CPU determines that the right-side traffic situation does not occur, makes a "No" determination in step 1050, and performs a process of step 1054 below.

Step 1054: The CPU sets the value of the right-side traffic situation flag to 0 and stores the value in the RAM of the driving assistance ECU 10. Then, the CPU transitions to step 814 in FIG. 8 below through step 1042.

In step 814 in FIG. 8, the CPU selects any one object having the object information acquired in step 808 and determines whether or not the value of the left-side attention calling flag of the selected object is 0 and the value of the right-side attention calling flag of the selected object is 0. When the values of both flags are 0, the CPU makes a "Yes" determination in step 814 (that is, determines that the object is not the target object) regardless of the values of the left-side traffic situation flag and the right-side traffic situation flag and performs a process of step 816 below. The CPU performs the processes of step 814 to step 824 for each selected object (refer to step 826 described below).

Step 816: The CPU does not generate the request signal for the selected object. Thus, attention is not called to the selected object by the display device 21. Then, the CPU transitions to step 826 described below.

When one of "the value of the left-side attention calling flag and the value of the right-side attention calling flag" of the selected object is 1, the CPU makes a "No" determination in step 814 and transitions to step 818 below.

In step 818, the CPU determines whether or not the value of the left-side attention calling flag of the selected object is 1 and the value of the left-side traffic situation flag of the selected object is 1. When the values of both flags are 1, the CPU makes a "Yes" determination in step 818 (that is, determines that while the selected object is the target object approaching from the left side of the host vehicle 100 (that is, a left target object), the left-side traffic situation hinders traveling of the target object, and consequently, the target object has a very low possibility of crossing the left-side expected path of the host vehicle 100 within the threshold time period) regardless of the value of the right-side traffic situation flag, and transitions to step 820 described below.

When at least one of the value of the left-side attention calling flag and the value of the left-side traffic situation flag of the selected object is 0, the CPU makes a "No" determination in step 818 and transitions to step 822 below.

In step 822, the CPU determines whether or not the value of the right-side attention calling flag of the selected object is 1 and the value of the right-side traffic situation flag of the selected object is 1. When the values of both flags are 1, the CPU makes a "Yes" determination in step 822 (that is, determines that while a target object approaching from the right side of the host vehicle 100 (that is, a right target object) is present, the right-side traffic situation hinders traveling of the target object, and consequently, the target object has a very low possibility of crossing the right-side expected path of the host vehicle 100 within the threshold time period) regardless of the value of the left-side traffic situation flag, and transitions to step 820 below.

Step 820: The CPU forbids generation of the request signal for the selected object. Thus, calling attention to the selected object by the display device 21 is forbidden. Then, the CPU transitions to step 826 described below.

When the value of the left-side attention calling flag of the selected object is 1 and the value of the left-side traffic situation flag of the selected object is 0, the CPU makes a "No" determination in step 822 (that is, determines that the selected object is the target object approaching from the left side of the host vehicle 100 and the target object moves without hindrance to traveling thereof since a traffic situation hindering traveling of the target object does not occur on the left side of the host vehicle 100, and consequently, the target object has a possibility of crossing the left-side expected path of the host vehicle 100 within the threshold time period) regardless of the value of the right-side traffic situation flag, and transitions to step 824 below. When the value of the right-side attention calling flag of the object is 1 and the value of the right-side traffic situation flag of the object is 0, the CPU makes a "No" determination in step 822 (that is, determines that the selected object is the target object approaching from the right side of the host vehicle 100 and the target object moves without hindrance to traveling thereof since a traffic situation hindering traveling of the target object does not occur on the right side of the host vehicle 100, and consequently, the target object has a possibility of crossing the right-side expected path of the host vehicle 100 within the threshold time period) regardless of the value of the left-side traffic situation flag, and transitions to step 824 below.

Step 824: The CPU generates the request signal for the selected object and transmits the request signal to the display ECU 20. Accordingly, attention is called to the selected object by the display device 21. Then, the CPU transitions to step 826 below.

In step 826, the CPU determines whether or not the processes from step 814 described above are executed for all objects having the object information acquired in step 808. When the processes described above are not yet executed for all objects, the CPU makes a "No" determination in step 826, returns to step 814, and repeats the processes from step 814 for the remaining objects. When, for example, any process of step 816 and step 820 is performed for the object B different from the object A at the time of calling attention to the object A by the process of step 824, the state of calling attention to the object A is continued. When, for example, the process of step 824 is performed for the object B different from the object A at the time of calling attention to the object A by the process of step 824, attention is called to both of the object A and the object B. That is, a determination as to whether or not to call attention is performed for each object. When the processes described above are executed for all objects, the CPU makes a "Yes" determination in step 826 and performs processes of step 828 and step 830 below in order.

Step 828: The CPU initializes (sets to 0) the values of the left-side attention calling flag and the right-side attention calling flag for each object. The CPU initializes (sets to 0) the values of the left-side traffic situation flag and the right-side traffic situation flag. The values of the left-side attention calling flag and the right-side attention calling flag and the values of the left-side traffic situation flag and the right-side traffic situation flag are initialized by the CPU when the engine switch is changed from the OFF state to the ON state.

Step 830: The CPU initializes (sets to 0) the values of the left-side same direction counter ksl, the right-side same direction counter ksr, the left-side opposite direction counter kol, and the right-side opposite direction counter kor. The values of the counters are initialized by the CPU when the engine switch is changed from the OFF state to the ON state. Then, the CPU transitions to step 832 and temporarily finishes the present routine.

Effects of the first embodied apparatus will be described. The first embodied apparatus determines whether or not a traffic situation that is estimated to hinder traveling of the target object occurs. Even when the first embodied apparatus determines that the target object is present, the first embodied apparatus forbids attention calling when the first embodied apparatus determines that the traffic situation occurs. When the traffic situation occurs, the target object has a very low possibility of crossing the left-side expected path and the right-side expected path of the host vehicle 100 within the threshold time period. Accordingly, even when the first embodied apparatus determines that the target object is present, the first embodied apparatus can forbid attention calling when the target object actually has a very low possibility of crossing the left-side expected path and the right-side expected path of the host vehicle 100 within the threshold time period due to occurrence of the traffic situation. Thus, the first embodied apparatus can significantly reduce the possibility of unneeded attention calling and can more appropriately call attention of the driver of the host vehicle.

The first embodied apparatus can determine whether the target object approaches from the left side or the right side of the host vehicle 100. The first embodied apparatus can determine whether the traffic situation occurs on the left side or the right side of the host vehicle 100. Accordingly, when the first embodied apparatus determines that the side on which the target object approaches the host vehicle 100 is the same as the side on which the traffic situation occurs with respect to the host vehicle 100 (that is, when the traffic situation has a very high possibility of hindering traveling of the target object), the first embodied apparatus can forbid calling attention to the target object. In other words, when the first embodied apparatus determines that the side on which the target object approaches the host vehicle 100 is different from the side on which the traffic situation occurs with respect to the host vehicle 100 (that is, when the traffic situation may not hinder traveling of the target object), the first embodied apparatus can call attention to the target object. Accordingly, the possibility of unneeded attention calling can be reduced with the reliability of attention calling maintained.

In the driving assistance ECU 10, the length (7 m) of the left-side same direction region Rsl and the length (25 m) of the left-side opposite direction region Rol in a part positioned in front of the host vehicle 100 (that is, the range of $x \geq 0$ in the xy coordinate plane) are greater than or equal to the length of each expected path of the host vehicle 100 (7 m in the present example). Thus, the line represented by the formula g of the target object (that is, an object having a possibility of crossing the part within the length of the left-side expected path and/or the right-side expected path within the predetermined time period) crosses the region Rsl and the region Rol. Accordingly, when the "left-side in-region object satisfying the conditions" is present in the region Rsl and the region Rol, the "left-side in-region object satisfying the conditions" has a possibility of hindering traveling of the target object. Thus, occurrence of the left-side traffic situation can be appropriately determined by determining that the left-side traffic situation occurs when the total left-side object number, which is the total of the number of "left-side in-region objects satisfying the conditions" in the predetermined period, is greater than or equal to the left-side threshold. Similarly, the length (7 m) of the right-side same direction region Rsl and the length (25 m) of the right-side opposite direction region Rol in the part positioned in front of the host vehicle 100 are greater than or equal to the length of each expected path of the host vehicle 100 (7 m in the present example). Thus, the line represented by the formula g of the target object crosses the region Rsr and the region Ror. Accordingly, when the "right-side in-region object satisfying the conditions" is present in the region Rsr and the region Ror, the "right-side in-region object satisfying the conditions" has a possibility of hindering traveling of the target object. Thus, occurrence of the right-side traffic situation can be appropriately determined by determining that the right-side traffic situation occurs when the total right-side object number, which is the total of the number of "right-side in-region objects satisfying the conditions" in the predetermined period, is greater than or equal to the right-side threshold.

Second Embodiment

Next, a driving assistance apparatus according to a second embodiment (hereinafter, referred to as a "second embodied apparatus") will be described. In the second embodied apparatus, a calculation method for determining whether or not a target object is present and a calculation method for determining whether or not a traffic situation occurs are different from the driving assistance ECU 10. That is, regarding the former method, the driving assistance ECU 10 determines whether the target object approaches from the left side or the right side of the host vehicle 100 by determining whether or not the left-side position condition is established for the object (target object) satisfying the intersection condition, the length condition, and the time period condition. The second embodied apparatus determines whether or not the intersection condition, the length condition, and the time period condition are established, and does not determine whether or not the left-side position condition is established. That is, the second embodied apparatus does not determine whether the target object approaches from the left side or the right side of the host vehicle 100. Regarding the latter method, the driving assistance ECU 10 individually determines whether or not the left-side traffic situation occurs and whether or not the right-side traffic situation occurs, by individually calculating the left-side object number (the number of left-side in-region objects satisfying the conditions in one cycle) and the right-side object number (the number of right-side in-region objects satisfying the conditions in one cycle). The second embodied apparatus calculates the number of objects which is the sum of the left-side object number and the right-side object number (that is, the number of "in-region objects satisfying the conditions in one cycle) without dividing the number of objects into the left-side object number and the right-side object number. The second embodied apparatus calculates the total number of objects which is the total of the number of objects in a predetermined period. When the total number of objects is greater than or equal to a predetermined threshold, the second embodied apparatus determines that a traffic situation (specific traffic situation) occurs around the host vehicle 100.

The second embodied apparatus is different from the driving assistance ECU 10 in that the second embodied apparatus does not determine whether the target object approaches from the left side or the right side of the host vehicle 100, and that the second embodied apparatus does not individually determine whether or not the left-side traffic situation occurs and whether or not the right-side traffic situation occurs. Thus, hereinafter, the difference from the driving assistance ECU 10 will be specifically described with reference to FIG. 12 to FIG. 15.

Figure 12:
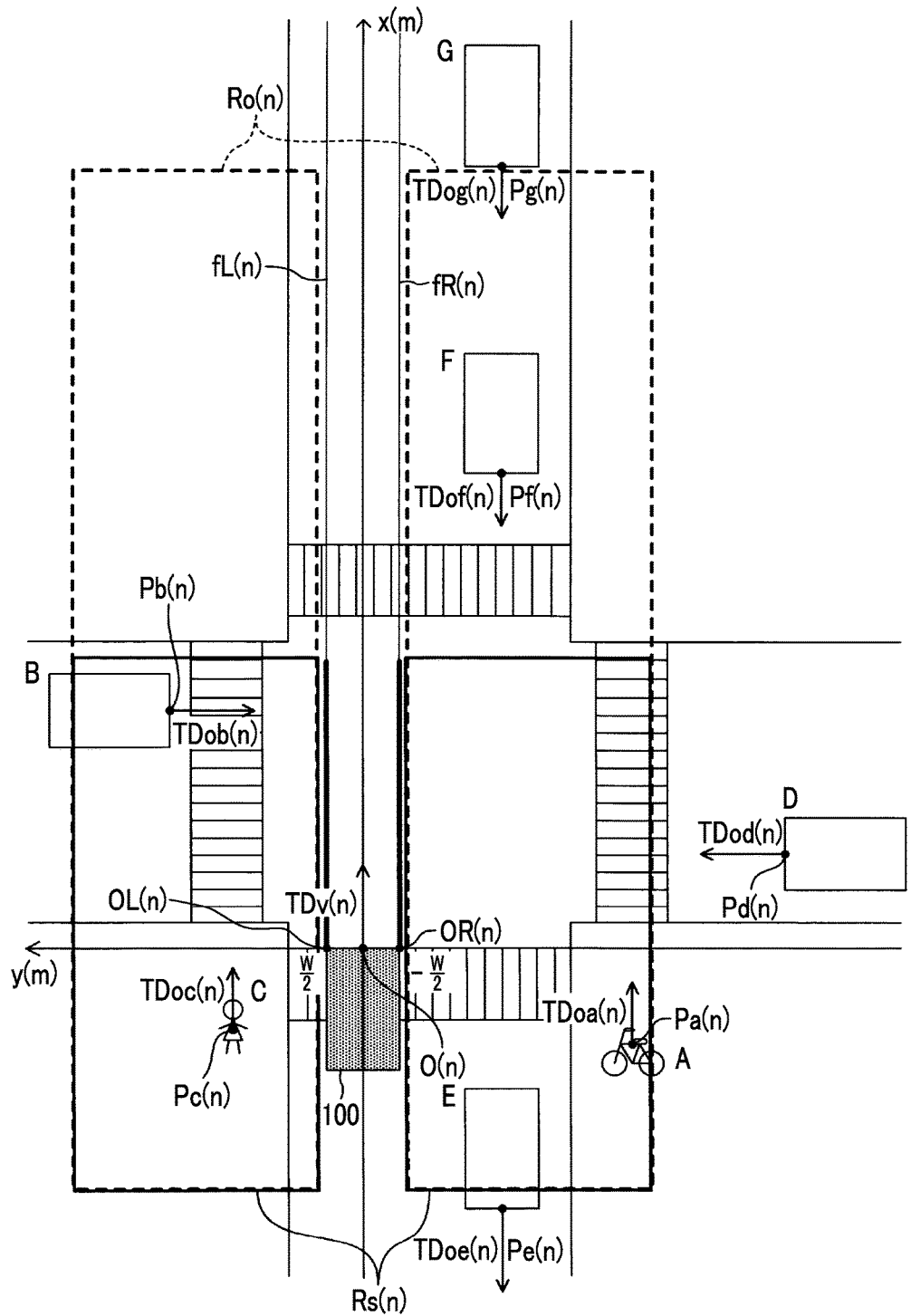
FIG. 12 is a diagram illustrating a same direction region and an opposite direction region that are set by a driving assistance apparatus according to a second embodiment of the present disclosure (hereinafter, referred to as a "second embodied apparatus") around a host vehicle at an n-th cycle.

E. Operation Related to Target Object Determination Setting of Attention Calling Flag When the second embodied apparatus extracts an object as the object satisfying all of the intersection condition, the length condition, and the time period condition, the second embodied apparatus determines that the object has a possibility of crossing the left-side expected path and/or the right-side expected path, and sets the value of the attention calling flag to 1 for the object. When the second embodied apparatus determines that the object is an object not satisfying any of the intersection condition, the length condition, and the time period condition, the second embodied apparatus determines that the object has a very low possibility of crossing the left-side expected path and/or the right-side expected path, and sets the value of the attention calling flag to 0 for the object. A driving assistance ECU of the second embodied apparatus retains the value of the attention calling flag set for each object in a RAM thereof in association with each object. FIG. 12 is the same as FIG. 4 except for the following points.

- The second embodied apparatus is mounted in the host vehicle 100 instead of the first embodied apparatus.
- The same direction region Rs(n) into which the left-side same direction region Rsl(n) and the right-side same direction region Rsr(n) are combined is set (described below).
- The opposite direction region Ro(n) into which the left-side opposite direction region Rol(n) and the right-side opposite direction region Ror(n) are combined is set (described below).

In the example in FIG. 12, the second embodied apparatus sets the value of the attention calling flag to 1 for each of the "object B and the object D" extracted as the object satisfying all of the intersection condition, the length condition, and the time period condition, and sets the value of the attention calling flag to 0 for each of the "object A, the object C, and the object E to the object G" that are not extracted since not satisfying the intersection condition.

F. Operation Related to Traffic Situation Determination

Setting of Same Direction Region and Opposite Direction Region

As illustrated in FIG. 12, the second embodied apparatus sets the same direction region Rs(n) into which the left-side same direction region Rsl(n) and the right-side same direction region Rsr(n) are combined, and the opposite direction region Ro(n) into which the left-side opposite direction region Rol(n) and the right-side opposite direction region Ror(n) are combined.

Counting of Number of Objects

The second embodied apparatus counts the number of "in-region objects satisfying the conditions (described above)" being present around the host vehicle 100.

Specifically, the second embodied apparatus counts the number of objects satisfying all of the same direction region condition, the same direction speed condition, and the same direction angle condition as the number of "in-region same direction objects satisfying the conditions" by a same direction counter ks. The second embodied apparatus counts the number of objects satisfying all of the opposite direction region condition, the opposite direction speed condition, and the opposite direction angle condition as the number of "in-region opposite direction objects satisfying the conditions" by an opposite direction counter ko. The second embodied apparatus calculates the total of both of the counted numbers (=ks+ko) as the number of "in-region objects satisfying the conditions" being present around the host vehicle 100 (hereinafter, the number will be referred to as the "number of objects").

According to the same assumption as the first embodiment, in the example in FIG. 12, the object A is classified as the "in-region same direction object satisfying the conditions" at the n-th cycle and thus, is one in number. The object E and the object F are classified as the "in-region opposite direction object satisfying the conditions" at the n-th cycle and thus, are two in number. Thus, the second embodied apparatus calculates the total of both of the counted numbers (that is, three) as the number of "in-region objects satisfying the conditions" (number of objects).

Calculation of Total Number of Objects

The second embodied apparatus calculates the total number of objects which is the total of the number of objects in the predetermined period. The total number of objects is calculated as the total of recently acquired M number of objects including the number of objects acquired at the most recent cycle. According to the same assumption as the first embodiment, in the example in FIG. 12, the number of "in-region same direction objects satisfying the conditions" is zero, zero, zero, one, and one in order from the (n−4)-th cycle to the n-th cycle. The number of "in-region opposite direction objects satisfying the conditions" is one, one, two, two, and two in order from the (n−4)-th cycle to the n-th cycle. Thus, the number of "in-region objects satisfying the conditions" (number of objects) is one, one, two, three, and three in order. Accordingly, the second embodied apparatus calculates the total of the number of "in-region objects satisfying the conditions" (that is, 10) as the total number of objects.

Determination as to Whether or not Traffic Situation Occurs and Setting of Traffic Situation Flag The second embodied apparatus determines whether or not the total number of objects is greater than or equal to the predetermined threshold. When the total number of objects is greater than or equal to the threshold, the second embodied apparatus determines that a "situation in which the "in-region object satisfying the conditions" hinders traveling of the target object (hereinafter, the situation may be referred to as the "traffic situation")" occurs, and sets the value of the traffic situation flag to 1. When the total number of objects is less than the threshold, the second embodied apparatus determines that the traffic situation does not occur, and sets the value of the traffic situation flag to 0. The driving assistance ECU 10 of the second embodied apparatus retains the set value of the traffic situation flag in the RAM of the driving assistance ECU 10.

The threshold is assumed to be seven in the example in FIG. 12. According to the assumption, since the total number of objects is 10 as described above, the total number of objects is greater than or equal to the threshold. Accordingly, the second embodied apparatus determines that the traffic situation occurs, and sets the value of the traffic situation flag to 1.

G. Operation Related to Attention Calling Determination

In the engine ON period, or each time the calculation time period Tcal elapses, the second embodied apparatus determines whether or not attention needs to be called for each object based on the value of the attention calling flag and the value of the traffic situation flag of each object.

When Attention is Called

Specifically, when the second embodied apparatus determines that the value of the attention calling flag of an object is 1 and the value of the traffic situation flag of the object is 0, the second embodied apparatus determines that "a target object is present, the target object moves without hindrance to traveling thereof since a traffic situation hindering traveling of the target object does not occur, and consequently, the target object has a possibility of crossing the left-side expected path and/or the right-side expected path of the host vehicle 100". The second embodied apparatus generates the request signal for the target object and calls attention to the target object by using the display device 21.

When Attention Calling is Forbidden

When the second embodied apparatus determines that the value of the attention calling flag of an object is 1 and the value of the traffic situation flag of the object is 1, the second embodied apparatus determines that "while a target object is present, a traffic situation hinders traveling of the target object, and consequently, the target object has a very low possibility of crossing the left-side expected path and/or the right-side expected path of the host vehicle 100". The second embodied apparatus forbids generation of the request signal for the target object and accordingly, forbids calling attention to the target object.

When Attention is not Called

When the second embodied apparatus determines that the value of the attention calling flag of an object is 0, the second embodied apparatus determines that the object is not the target object regardless of the value of the traffic situation flag. The second embodied apparatus does not generate the request signal for the object and accordingly, does not call attention to the object.

Specific Operation of Second Embodied Apparatus

Next, specific operation of the second embodied apparatus will be described. The CPU of the driving assistance ECU 10 of the second embodied apparatus executes routines illustrated in flowcharts in FIG. 13 to FIG. 15 each time the calculation time period Tcal elapses. Hereinafter, the routines at the n-th cycle (n≥M) will be described.

Figure 13:
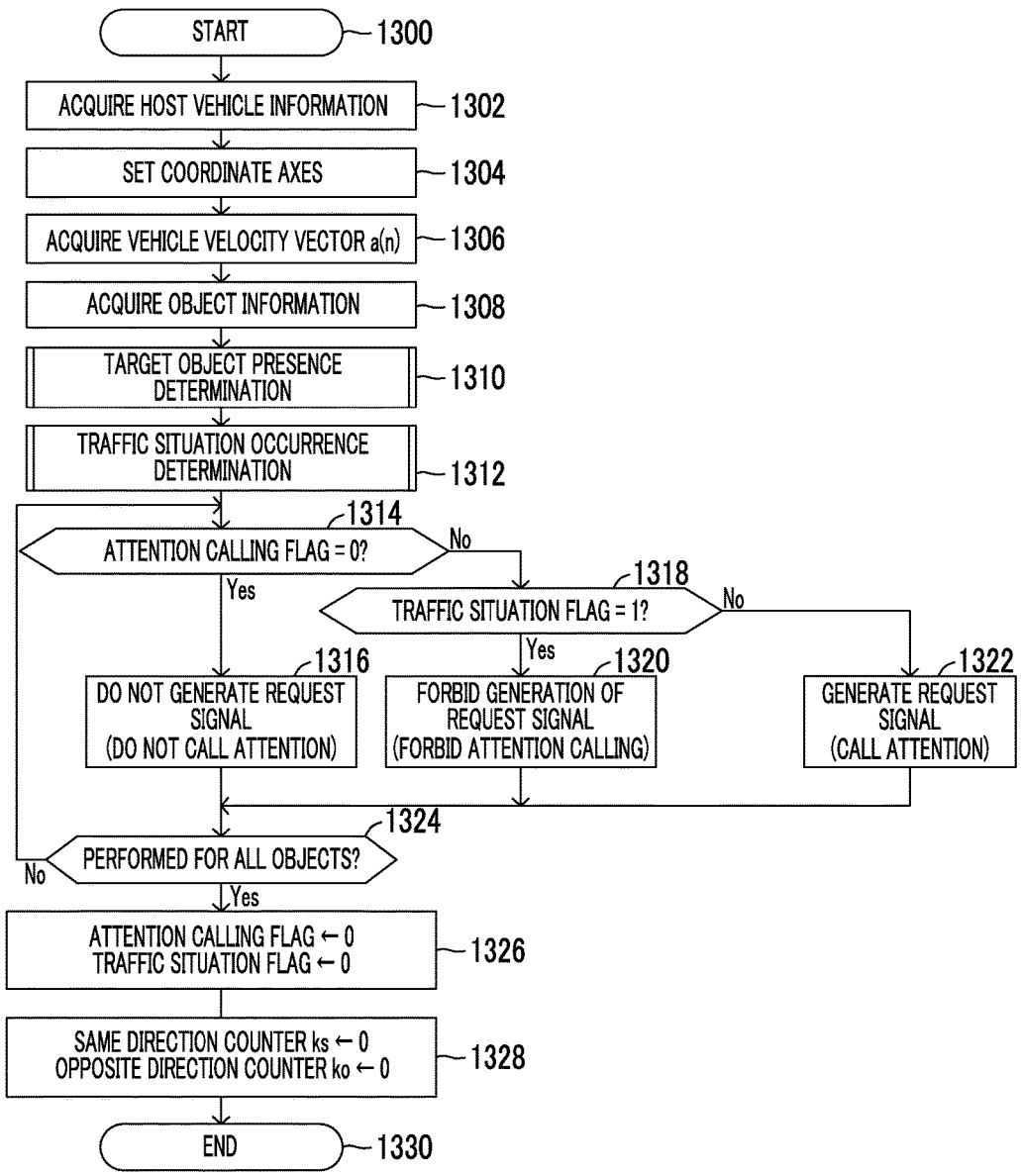
FIG. 13 is a flowchart (1) illustrating a routine executed by a CPU of a driving assistance ECU of the second embodied apparatus (hereinafter, referred to as a "CPU of the second embodied apparatus")

When a predetermined timing arrives, the CPU starts from a process of step 1300 in FIG. 13 and performs processes of step 1302 to step 1308. The processes of step 1302 to step 1308 are respectively the same as the processes of step 802 to step 808 in FIG. 8 and thus, will not be described.

When the CPU finishes the process of step 1308, the CPU performs a target object determination process in step 1310 and then, performs a traffic situation determination process in step 1312. Hereinafter, the process of step 1310 will be first described, and then, the process of step 1312 will be described. The CPU may perform the process of step 1310 after performing the process of step 1312, or may perform step 1312 along with step 1310.

Figure 14:
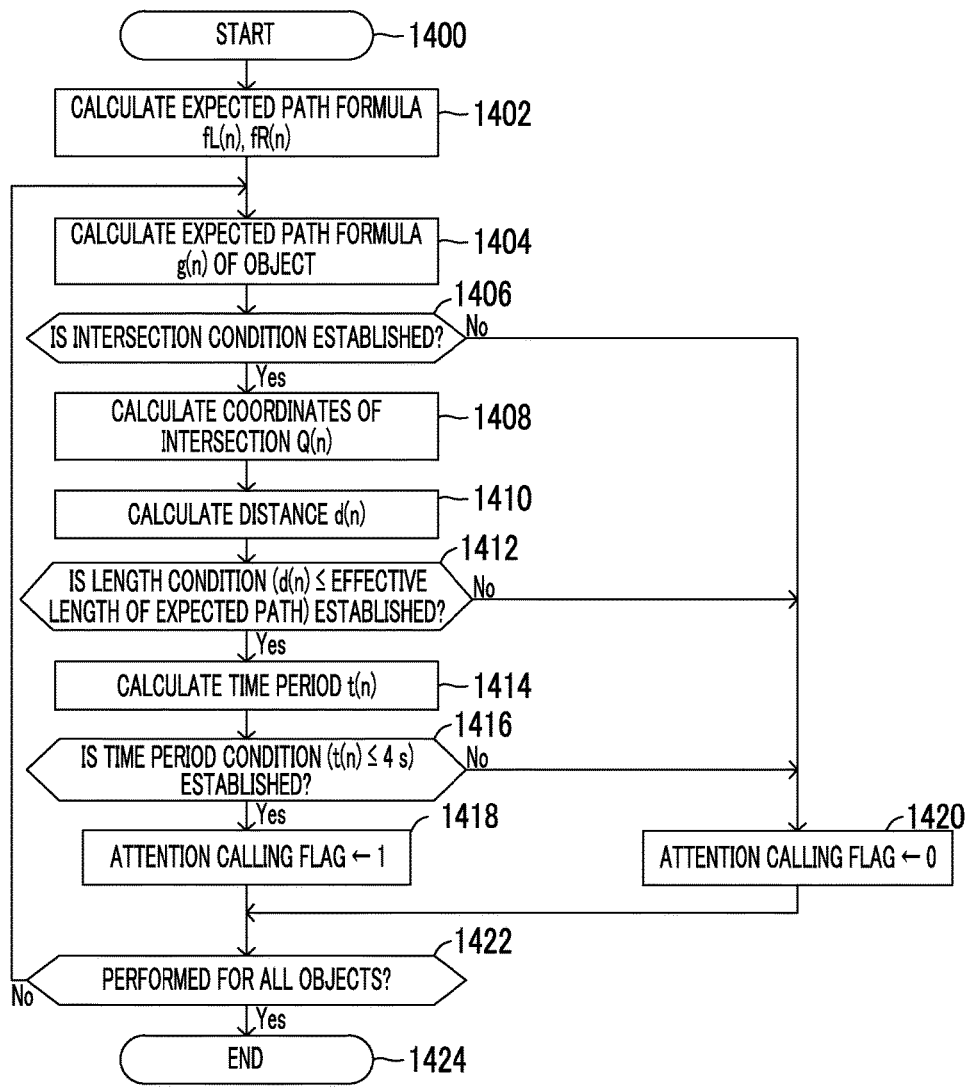
FIG. 14 is a flowchart (2) illustrating a routine executed by the CPU of the second embodied apparatus.

In the routine in FIG. 13, the CPU in step 1310 executes the routine illustrated in the flowchart in FIG. 14. When the CPU transitions to step 1310, the CPU starts from a process of step 1400 in FIG. 14. Processes or determinations of step 1402 to step 1416 in FIG. 14 are respectively the same as the processes or the determinations of step 902 to step 916 in FIG. 9 and thus, will not be described.

When the CPU makes a "Yes" determination in step 1416 (that is, when the CPU determines that the time period condition is established), the CPU transitions to step 1418 below.

Step 1418: The CPU sets the value of the attention calling flag to 1 for the object for which the CPU in step 1416 determines that the time period condition is established, and stores the set value in the RAM of the driving assistance ECU 10 in association with the object. Then, the CPU transitions to step 1422 described below.

When the CPU in step 1406 determines that the intersection condition is not established, when the CPU in step 1412 determines that the length condition is not established, or when the CPU in step 1416 determines that the time period condition is not established, the CPU determines that the object selected in step 1404 does not approach from any of the left side and the right side of the host vehicle 100 (in other words, the CPU determines that the selected object has no possibility of crossing each expected path within the threshold time period). The CPU makes a "No" determination in step 1406, step 1412, or step 1416 and transitions to step 1420 below.

Step 1420: The CPU sets the value of the attention calling flag of the object selected in step 1404 to 0 and stores the set value in the RAM of the driving assistance ECU 10 in association with the object. Then, the CPU transitions to step 1422 below.

In step 1422, the CPU determines whether or not the processes from step 1404 described above are executed for all objects having the object information acquired in step 1308 in FIG. 13. When the CPU determines that the processes described above are not yet executed for all objects, the CPU makes a "No" determination in step 1422, returns to step 1404, and repeats the processes from step 1404 for the remaining objects. When the CPU determines that the processes described above are executed for all objects, the CPU makes a "Yes" determination in step 1422 and transitions to step 1312 in FIG. 13 through step 1424.

Next, the process of step 1312 in FIG. 13 will be described. In the routine in FIG. 13, the CPU in step 1312 executes the routine illustrated in the flowchart in FIG. 15. When the CPU transitions to step 1312, the CPU starts from a process of step 1500 in FIG. 15 and performs a process of step 1502 described below.

Step 1502: The CPU sets the same direction region Rs(n) and the opposite direction region Ro(n) on the xy coordinate plane as described above. When the CPU finishes the process of step 1502, the CPU transitions to step 1504.

Figure 15:
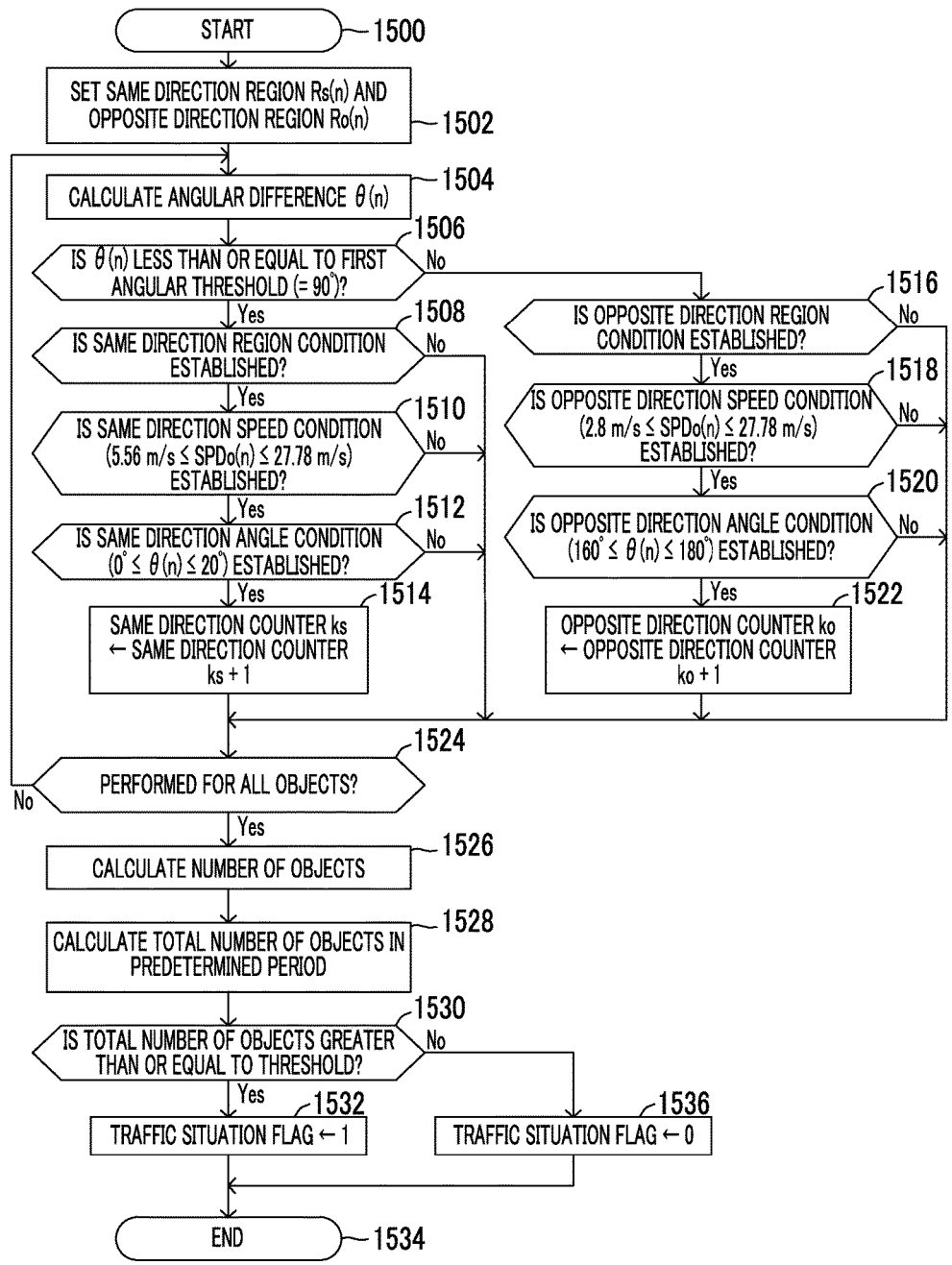
FIG. 15 is a flowchart (3) illustrating a routine executed by the CPU of the second embodied apparatus.

Processes or determinations of step 1504 to step 1512 in FIG. 15 are respectively the same as the processes or the determinations of step 1004 to step 1012 in FIG. 10. Determinations of step 1516 to step 1520 in FIG. 15 are respectively the same as the determinations of step 1020 to step 1024 in FIG. 10. Thus, step 1516 to step 1520 will not be described.

When the CPU makes a "Yes" determination in step 1512 (that is, when the CPU determines that the same direction angle condition is established), the CPU transitions to step 1514 below.

Step 1514: The CPU increases the value of the same direction counter ks by one and stores the value in the RAM of the driving assistance ECU 10. Then, the CPU transitions to step 1524 described below.

When the CPU in step 1508 determines that the same direction region condition is not established, when the CPU in step 1510 determines that the same direction speed condition is not established, or when the CPU in step 1512 determines that the same direction angle condition is not established, the CPU makes a "No" determination in step 1508, step 1510, or step 1512 and transitions to step 1524 described below.

When the CPU makes a "Yes" determination in step 1520 (that is, when the CPU determines that the opposite direction angle condition is established), the CPU transitions to step 1522 below.

Step 1522: The CPU increases the value of the opposite direction counter ko by one and stores the value in the RAM of the driving assistance ECU 10. Then, the CPU transitions to step 1524 described below.

When the CPU in step 1516 determines that the opposite direction region condition is not established, when the CPU in step 1518 determines that the opposite direction speed condition is not established, or when the CPU in step 1520 determines that the opposite direction angle condition is not established, the CPU makes a "No" determination in step 1516, step 1518, or step 1520 and transitions to step 1524 below.

In step 1524, the CPU determines whether or not the processes from step 1504 described above are executed for all objects having the object information acquired in step 1308 in FIG. 13. When the CPU determines that the processes described above are not yet executed for all objects, the CPU makes a "No" determination in step 1524, returns to step 1504, and repeats the processes from step 1504 for the remaining objects. When the CPU determines that the processes described above are executed for all objects, the CPU makes a "Yes" determination in step 1524 and performs processes of step 1526 and step 1528 below in order.

Step 1526: The CPU calculates the number of objects (that is, the number of in-region objects satisfying the conditions at the n-th cycle=ks+ko) from the total of the value of the same direction counter ks in step 1514 and the value of the opposite direction counter ko in step 1522, and stores the number of objects in the RAM of the driving assistance ECU 10.

Step 1528: The CPU calculates the total number of objects by adding the number of objects at the n-th cycle calculated in step 1526 to the total of recently acquired (M−1) number of objects (that is, the total of the number of objects from the (n−4)-th cycle to the (n−1)-th cycle), and stores the total number of objects in the RAM of the driving assistance ECU 10.

Next, the CPU transitions to step 1530 and determines whether or not the total number of objects calculated in step 1528 is greater than or equal to the threshold. When the total number of objects is greater than or equal to the threshold, the CPU determines that the traffic situation occurs. In such a case, the CPU makes a "Yes" determination in step 1530 and performs a process of step 1532 below.

Step 1532: The CPU sets the value of the traffic situation flag to 1 and stores the value in the RAM of the driving assistance ECU 10. Then, the CPU transitions to step 1314 in FIG. 13 through step 1534.

When the total number of objects is less than the threshold, the CPU determines that the traffic situation does not occur. In such a case, the CPU makes a "No" determination in step 1530 and performs a process of step 1536 below.

Step 1536: The CPU sets the value of the traffic situation flag to 0 and stores the value in the RAM of the driving assistance ECU 10. Then, the CPU transitions to step 1314 in FIG. 13 through step 1534.

In step 1314 in FIG. 13, the CPU selects any one of objects having the object information acquired in step 1308 and determines whether or not the value of the attention calling flag of the selected object is 0. When the value of the attention calling flag is 0, the CPU makes a "Yes" determination in step 1314 (that is, determines that the object is not the target object) regardless of the value of the traffic situation flag and performs a process of step 1316 below. The CPU performs the processes of step 1314 to step 1322 for each selected object (refer to step 1324 described below).

Step 1316: The CPU does not generate the request signal for the selected object. Thus, attention is not called to the selected object by the display device 21. Then, the CPU transitions to step 1324 described below.

When the value of the attention calling flag of the selected object is 1, the CPU makes a "No" determination in step 1314 and transitions to step 1318 below.

In step 1318, the CPU determines whether or not the value of the traffic situation flag is 1. When the value of the traffic situation flag is 1 (that is, when the value of the attention calling flag of the selected object is 1 and the value of the traffic situation flag of the selected object is 1), the CPU makes a "Yes" determination in step 1318 (that is, determines that while the selected object is the target object, the traffic situation hinders traveling of the target object, and consequently, the target object has a very low possibility of crossing the left-side expected path and/or the right-side expected path of the host vehicle 100 within the threshold time period), and transitions to step 1320 below.

Step 1320: The CPU forbids generation of the request signal for the selected object. Thus, calling attention to the selected object by the display device 21 is forbidden. Then, the CPU transitions to step 1324 described below.

When the value of the traffic situation flag is 0 (that is, when the value of the attention calling flag of the selected object is 1 and the value of the traffic situation flag of the selected object is 0), the CPU makes a "No" determination in step 1318 (that is, determines that the selected object is the target object and the target object moves without hindrance to traveling thereof since a traffic situation hindering traveling of the target object does not occur, and consequently, the target object has a possibility of crossing the left-side expected path and/or the right-side expected path of the host vehicle 100 within the threshold time period), and transitions to step 1322 below.

Step 1322: The CPU generates the request signal for the selected object and transmits the request signal to the display ECU 20. Accordingly, attention is called to the selected object by the display device 21. Then, the CPU transitions to step 1324 below.

In step 1324, the CPU determines whether or not the processes from step 1314 described above are executed for all objects having the object information acquired in step 1308. When the processes described above are not yet executed for all objects, the CPU makes a "No" determination in step 1324, returns to step 1314, and repeats the processes from step 1314 for the remaining objects. When, for example, any process of step 1316 and step 1320 is performed for the object B different from the object A at the time of calling attention to the object A by the process of step 1322, the state of calling attention to the object A is continued. When, for example, the process of step 1322 is performed for the object B different from the object A at the time of calling attention to the object A by the process of step 1322, attention is called to both of the object A and the object B. That is, a determination as to whether or not to call attention is performed for each object. When the processes described above are executed for all objects, the CPU makes a "Yes" determination in step 1324 and performs processes of step 1326 and step 1328 below in order.

Step 1326: The CPU initializes (sets to 0) the value of the attention calling flag for each object. The CPU initializes (sets to 0) the value of the traffic situation flag. The value of the attention calling flag and the value of the traffic situation flag are initialized by the CPU when the engine switch is changed from the OFF state to the ON state.

Step 1328: The CPU initializes (sets to 0) the values of the same direction counter ks and the opposite direction counter ko. Then, the CPU transitions to step 1330 and temporarily finishes the present routine. The values of the counters are initialized by the CPU when the engine switch is changed from the OFF state to the ON state.

The second embodied apparatus can also significantly reduce the possibility of unneeded attention calling and can more appropriately call attention of the driver of the host vehicle 100.

Modification Example

Next, a driving assistance apparatus according to a modification example of the second embodiment (hereinafter, referred to as a "second modified apparatus") will be described. In the second modified apparatus, a calculation method for extracting an object traveling approximately parallel to the host vehicle 100 from objects being present around the host vehicle 100 is different from the second embodied apparatus. That is, the second embodied apparatus, first, classifies all objects being present around the host vehicle 100 as any of the same direction object and the opposite direction object for convenience based on the determination result as to whether or not the angular difference $\theta(n)$ is less than or equal to the first threshold (=)90° (refer to step 1506 in FIG. 15). The second embodied apparatus extracts the same direction object satisfying the same direction angle condition ($0° \leq \theta(n) \leq 20°$) as the "in-region same direction object satisfying the conditions" (refer to step 1512 in FIG. 15). The second embodied apparatus extracts the opposite direction object satisfying the opposite direction angle condition ($160° \leq \theta(n) \leq 180°$ as the "in-region opposite direction object satisfying the conditions" (refer to step 1520 in FIG. 15).

The second modified apparatus determines, for all objects being present around the host vehicle 100, whether or not the angular difference θ(n) of the object is less than or equal to a fourth angular threshold (20° in the present example). The fourth angular threshold is set to a value smaller than the first angular threshold (90° in the present example). When the second modified apparatus determines that the angular difference θ(n) of the object is less than or equal to the fourth angular threshold (that is, when the second modified apparatus determines that 0°≤θ(n)≤20° is satisfied), the second modified apparatus determines that the object is the same direction object of which the traveling direction TDo(n) is approximately parallel to the traveling direction TDv(n) of the host vehicle 100, and extracts the object as the same direction object. When the second modified apparatus determines that the angular difference θ(n) of the object is greater than the fourth angular threshold (that is, when the second modified apparatus determines that 20°<θ(n)≤180° is satisfied), the second modified apparatus determines whether or not the angular difference θ(n) of the object is greater than or equal to a fifth angular threshold (160° in the present example). The fifth angular threshold is set to a value greater than the first angular threshold. When the second modified apparatus determines that the angular difference θ(n) of the object is greater than or equal to the fifth angular threshold (that is, when the second modified apparatus determines that 160°≤θ(n)≤180° is satisfied), the second modified apparatus determines that the object is the opposite direction object of which the traveling direction TDo(n) is approximately parallel to the traveling direction TDv(n) of the host vehicle 100, and extracts the object as the opposite direction object.

When the second modified apparatus extracts the object as the same direction object, the second modified apparatus determines whether or not the same direction object satisfies the same direction region condition and the same direction speed condition. When the second modified apparatus determines that both conditions are satisfied, the second modified apparatus extracts the same direction object as the "in-region same direction object satisfying the conditions". When the second modified apparatus extracts the object as the opposite direction object, the second modified apparatus determines whether or not the opposite direction object satisfies the opposite direction region condition and the opposite direction speed condition. When the second modified apparatus determines that both conditions are satisfied, the second modified apparatus extracts the opposite direction object as the "in-region opposite direction object satisfying the conditions".

That is, the second modified apparatus does not perform the process of classifying all objects being present around the host vehicle 100 as the same direction object or the opposite direction object for convenience, and first performs determinations corresponding to step 1512 and step 1520 in the second embodied apparatus. After the determinations, the second modified apparatus performs determinations corresponding to step 1508 and step 1510 and determinations corresponding to step 1516 and step 1518 in the second embodied apparatus. Accordingly, a processing time period can be shortened further than a configuration in which an object traveling approximately parallel to the host vehicle is extracted after all objects being present around the host vehicle 100 are classified as the same direction object or the opposite direction object. The configuration of the present modification example may be applied to the driving assistance ECU 10.

While the driving assistance apparatus according to the embodiments of the present disclosure is described heretofore, the present disclosure is not limited thereto. Various modifications can be made to the extent not departing from the gist of the present disclosure.

For example, the driving assistance apparatus may include an alert ECU and a buzzer instead of the display ECU 20 and the display device 21 or in addition to the display ECU 20 and the display device 21. Specifically, the alert ECU is connected to the driving assistance ECU 10 through the communication and sensor system CAN 90 in a manner capable of exchanging data. The buzzer is connected to the alert ECU. When the alert ECU receives the attention calling request signal from the driving assistance ECU 10, the alert ECU transmits an instruction signal to the buzzer. When the buzzer receives the instruction signal from the alert ECU, the buzzer emits an alert in order to call attention of the driver. Such a configuration can also achieve the same effects as the embodied apparatuses and the modified apparatus.

The driving assistance apparatus may automatically brake the host vehicle 100 instead of calling attention of the driver of the host vehicle 100 or in addition to attention calling. Specifically, the driving assistance apparatus includes a brake ECU and an automatic brake actuator instead of the display ECU 20 and the display device 21. The brake ECU is connected to the driving assistance ECU 10 through the communication and sensor system CAN 90 in a manner capable of exchanging data. The automatic brake actuator is connected to the brake ECU. When the driving assistance ECU 10 generates the attention calling request signal, the driving assistance ECU 10 generates an automatic braking request signal in order to automatically brake the host vehicle 100 and transmits the automatic braking request signal to the brake ECU. When the brake ECU receives the automatic braking request signal from the driving assistance ECU 10, the brake ECU transmits an instruction signal to the automatic brake actuator. When the automatic brake actuator receives the instruction signal from the brake ECU, the automatic brake actuator performs automatic braking by operating a brake device. The driving assistance apparatus forbids generation of the automatic braking request signal when the driving assistance apparatus determines that the target object is present and the traffic situation occurs. That is, the driving assistance apparatus forbids automatic braking. Such a configuration can also significantly reduce the possibility of unneeded automatic braking and can automatically brake the host vehicle 100 more appropriately.

Figure 16:
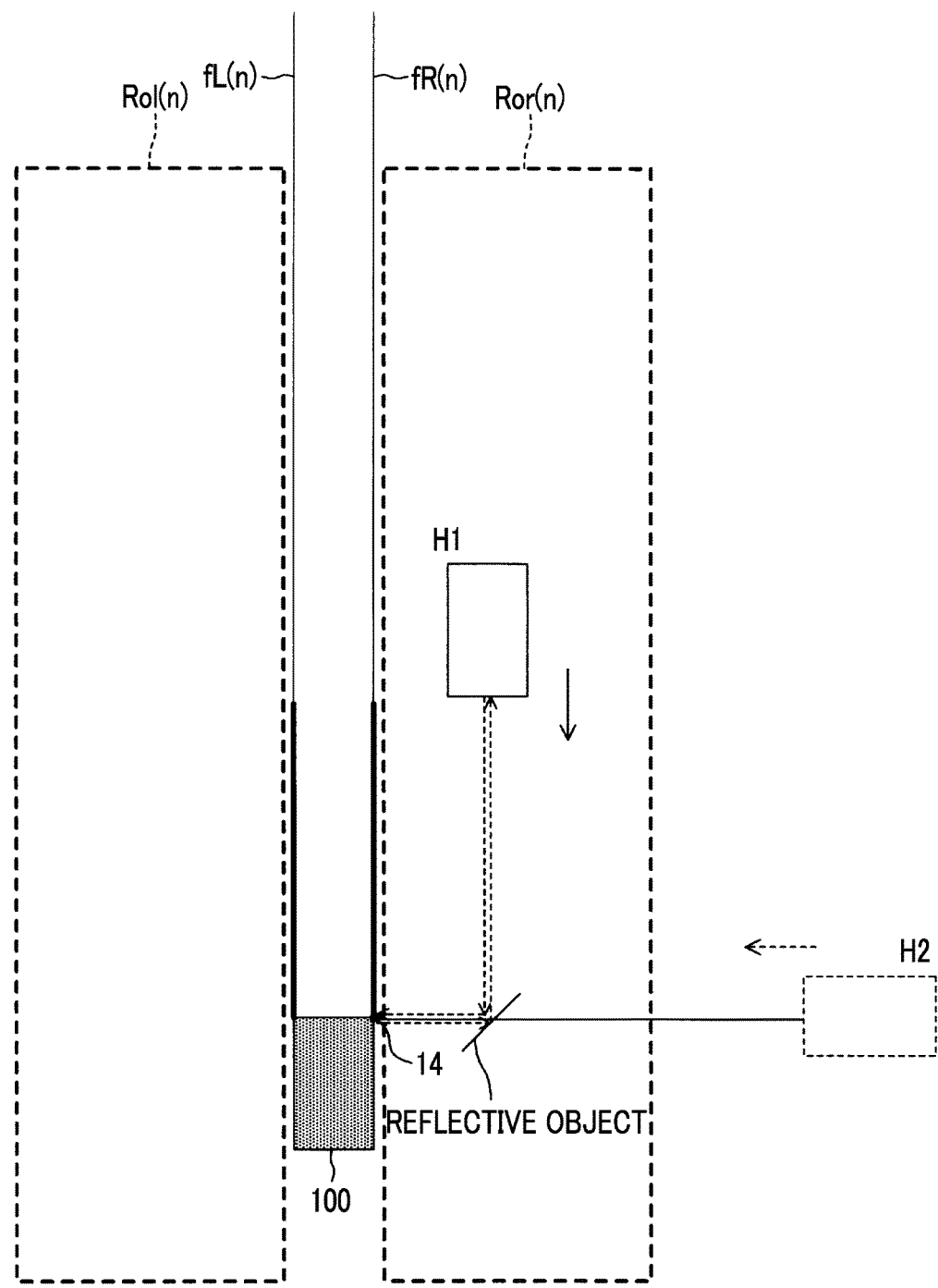
FIG. 16 is a diagram used for describing attention calling when the target object is a ghost object.

Depending on the shape of a road on which the host vehicle 100 travels, as illustrated in FIG. 16, a reflective object such as a building and a signboard may be present along the road. The electromagnetic wave transmitted from each radar sensor 14 may be reflected by the reflective object and an object H1 and may travel along a path illustrated by a broken line arrow. In such a case, each radar sensor 14 receives the electromagnetic wave as a reflective wave (refer to a solid line arrow) reflected in a position illustrated by a broken line H2. Hereinafter, such a reflective wave will be referred to as a "ghost wave". That is, each radar sensor 14 receives two electromagnetic waves of a "typical reflective wave (not illustrated) that is not the ghost wave" reflected from the object and the "ghost wave". Thus, the driving assistance apparatus acquires two pieces of object information that are the object information of an existing object (object H1) and the object information of a non-existing object (an object illustrated by the broken line H2; hereinafter, referred to as a "ghost object"). A driving assistance apparatus in the related art performs the target object determination based on the object information of the ghost object.

Consequently, when the driving assistance apparatus in the related art determines that the ghost object is the target object, attention calling or automatic braking is performed for the non-existing object, and a problem arises in that unneeded driving assistance is performed. The driving assistance apparatus disclosed in the present specification performs the traffic situation determination process along with the target object determination process. When the driving assistance apparatus determines that the traffic situation occurs (that is, when the total number of objects is greater than or equal to the threshold), the driving assistance apparatus forbids attention calling or automatic braking even when the driving assistance apparatus determines that the target object is present. In a situation where the driving assistance apparatus determines that the ghost object (H2) is the target object, the existing object (H1) has a very high possibility of traveling approximately parallel to the host vehicle 100 (refer to FIG. 16). Thus, when the driving assistance apparatus determines that the existing object satisfies each condition (in the example in FIG. 16, when the driving assistance apparatus determines that the object H1 satisfies the opposite direction region condition, the opposite direction speed condition, and the opposite direction angle condition), the existing object is counted as the "in-region object satisfying the conditions", and the total number of objects in the predetermined period is at least one. Thus, by setting the threshold to "1", the total number of objects is greater than or equal to the threshold, and the driving assistance apparatus determines that the traffic situation occurs. Consequently, the driving assistance apparatus forbids attention calling or automatic braking for the ghost object and can significantly reduce the possibility of unneeded attention calling or automatic braking for the ghost object That is, the configurations of the embodiments and the modification example can be applied for the ghost object by setting the threshold to "1". Accordingly, the embodied apparatuses and the modified apparatus can significantly reduce the possibility of performing "unneeded attention calling or automatic braking caused by the ghost object" not only when the host vehicle 100 travels near an intersection but also when the host vehicle 100 travels on a road not having a crossroad (that is, a road that intersects with the traveling road on which the host vehicle 100 travels).

A driving assistance apparatus according to another modification example of the present disclosure may include cameras instead of the radar sensors 14. The driving assistance apparatus may calculate the total number of objects in the predetermined period by analyzing image data received by each camera, and may determine whether or not the traffic situation occurs. Alternatively, the driving assistance apparatus according to the other modification example of the present disclosure may acquire color information of a traffic signal from the image data of the traffic signal on the crossroad at the intersection instead of calculating the total number of objects, and may determine that the traffic situation occurs when the color information indicates red.

The driving assistance apparatus may acquire the color information of the traffic signal on the crossroad by road-to-vehicle communication instead of calculating the total number of objects, and may determine that the traffic situation occurs when the color information indicates red.

A driving assistance apparatus according to another modification example of the first embodiment of the present disclosure may assign a point (weight value) to each "left-side in-region same direction object satisfying the conditions" in accordance with the "distance between each object and the host vehicle 100, the speed of each object, and the like" instead of counting the number of "left-side in-region same direction objects satisfying the conditions", and may employ the total of the point as the "number of left-side in-region same direction objects satisfying the conditions". The same applies to the number of left-side in-region opposite direction objects satisfying the conditions, the number of right-side in-region same direction objects satisfying the conditions, and the number of right-side in-region opposite direction objects satisfying the conditions. In such a case, the assigned point is increased as the degree of hindering traffic of the target object is higher. Similarly, the total of the assigned point may be used as the number of in-region objects satisfying the conditions at the n-th cycle in the second embodiment.

The predetermined period is not limited to a period corresponding to a plurality of cycles and may be a period corresponding to one cycle. The cause of hindering traveling of the target object is not limited to an object traveling in front of the target object at the current point in time. For example, the target object may decelerate due to influence of an object previously passing in front of the target object (for example, the object E in FIG. 4), and may not cross the expected path of the host vehicle 100 within the threshold time period. In such a case, the object previously passing in front of the target object is also the cause of hindering traveling of the target object, and the object also contributes to occurrence of the traffic situation. Accordingly, by setting the predetermined period to a period corresponding to a plurality of cycles and counting such an object as the "in-region object satisfying the conditions" as in each embodiment, the accuracy of determining whether or not the traffic situation occurs is improved. Consequently, the possibility of performing unneeded attention calling or automatic braking can be further reduced.

The angular difference may be calculated by another method. For example, a coordinate axis on which an origin is fixed in a predetermined position may be set. The angle of the traveling direction TDv of the host vehicle 100 with the coordinate axis as a reference and the angle of the traveling direction TDo of the object with the coordinate axis as a reference may be calculated, and the difference between both angles may be calculated as the angular difference.

The sizes of the four regions (the region Rsl, the region Rsr, the region Rol, and the region Ror) set around the host vehicle 100 may be different from each other.

The host vehicle 100 may be an electric vehicle or a hybrid car. When the host vehicle 100 is an electric vehicle, a period in which a vehicle drive motor is set in a drivable state corresponds to the engine ON period in the embodied apparatuses and the modified apparatus. When the host vehicle 100 is a hybrid car, a period in which a vehicle drive motor is set in a drivable state and a period in which an engine is in the ON state (a period in which a hybrid system is started and is operable) correspond to the engine ON period in the embodied apparatuses and the modified apparatus.

The driving assistance apparatus may be configured to estimate one or three or more expected paths instead of estimating two expected paths of the left-side expected path and the right-side expected path. The expected path is not limited to paths through which the left end OL and the right end OR of the host vehicle 100 are expected to pass (that is, the left-side expected path and the right-side expected path). For example, the expected path may be a path through which the position O of the host vehicle 100 is expected to pass.

The driving assistance apparatus may be mounted not only in a vehicle traveling on a left-hand traffic road but also in a vehicle traveling on a right-hand traffic road.

The driving assistance apparatus may use a value estimated from the horizontal acceleration and the vehicle speed SPDv as the yaw rate Y or use a value estimated from the steering angle and the vehicle speed SPDv as the yaw rate Y instead of using the value detected by yaw rate sensor 13 as the yaw rate Y.

What is claimed is:

1. A driving assistance apparatus comprising:
a plurality of sensor devices that is mounted in a host vehicle and is configured to acquire host vehicle information including a parameter representing a traveling state of the host vehicle and object information including a relative position of an object being present around the host vehicle with respect to the host vehicle, a traveling direction of the object, and a speed of the object; and
at least one electronic control unit configured to
determine, based on the host vehicle information, whether or not the host vehicle is traveling straight,
when the electronic control unit determines that the host vehicle is traveling straight, estimate a linear path of a finite length extending in the traveling direction of the host vehicle from the host vehicle as an expected path based on the host vehicle information,
determine, based on the object information, whether or not a target object that is an object having a possibility of crossing the expected path within a threshold time period is present,
determine whether or not a traffic situation that is estimated to hinder traveling of the target object occurs,
generate a driving assistance request signal when the electronic control unit determines that the target object is present and that the traffic situation does not occur, and forbid generation of the driving assistance request signal when the electronic control unit determines that the target object is present and that the traffic situation occurs, and
execute, in response to generation of the driving assistance request signal, driving assistance of at least one of attention calling assistance and automatic braking assistance, the attention calling assistance calling attention of a driver to the target object, and the automatic braking assistance automatically braking the host vehicle.

2. The driving assistance apparatus according to claim 1, wherein:
the electronic control unit is configured to extract, based on the host vehicle information and the object information, a same direction object that is an object which travels with an angular difference with respect to the traveling direction of the host vehicle, is present in a same direction region set in advance around the host vehicle, and travels at a speed within a predetermined same direction speed range, the angular difference being less than or equal to a predetermined first threshold angular difference for same direction determination;
the electronic control unit is configured to extract, based on the host vehicle information and the object information, an opposite direction object that is an object which travels with an angular difference with respect to the traveling direction of the host vehicle, is present in an opposite direction region set around the host vehicle, and travels at a speed within a predetermined opposite direction speed range, the angular difference being greater than or equal to a predetermined second threshold angular difference for opposite direction determination; and
the electronic control unit is configured to determine that the traffic situation occurs, when a value based on a total of the number of the same direction objects and the number of the opposite direction objects is greater than or equal to a predetermined value.

3. The driving assistance apparatus according to claim 1, wherein:
the electronic control unit is configured to determine whether or not a left target object approaching the expected path from a left side of the traveling direction of the host vehicle is present among the target objects;
the electronic control unit is configured to extract, based on the host vehicle information and the object information, a left-side in-region same direction object that is an object which travels with an angular difference with respect to the traveling direction of the host vehicle, is present in a left-side same direction region set on the left side of the traveling direction of the host vehicle around the host vehicle, and travels at a speed within a predetermined same direction speed range, the angular difference being less than or equal to a predetermined first threshold angular difference for same direction determination;
the electronic control unit is configured to extract, based on the host vehicle information and the object information, a left-side in-region opposite direction object that is an object which travels with an angular difference with respect to the traveling direction of the host vehicle, is present in a left-side opposite direction region set on the left side of the traveling direction of the host vehicle around the host vehicle, and travels at a speed within a predetermined opposite direction speed range, the angular difference being greater than or equal to a predetermined second threshold angular difference for opposite direction determination;
the electronic control unit is configured to determine that a left traffic situation that is the traffic situation with respect to the left target object occurs, when a value based on a total of the number of the left-side in-region same direction objects and the number of the left-side in-region opposite direction objects is greater than or equal to a predetermined value; and
the electronic control unit is configured to forbid generation of the driving assistance request signal for the left target object when the electronic control unit determines that the left target object is present and that the left traffic situation occurs.

4. The driving assistance apparatus according to claim 1, wherein:
the electronic control unit is configured to determine whether or not a right target object approaching the expected path from a right side of the traveling direction of the host vehicle is present among the target objects;
the electronic control unit is configured to extract, based on the host vehicle information and the object information, a right-side in-region same direction object that is an object which travels with an angular difference with respect to the traveling direction of the host vehicle, is present in a right-side same direction region set on the right side of the traveling direction of the host vehicle around the host vehicle, and travels at a speed within a predetermined same direction speed range, the angular difference being less than or equal to a predetermined first threshold angular difference for same direction determination;

the electronic control unit is configured to extract, based on the host vehicle information and the object information, a right-side in-region opposite direction object that is an object which travels with an angular difference with respect to the traveling direction of the host vehicle, is present in a right-side opposite direction region set on the right side of the traveling direction of the host vehicle around the host vehicle, and travels at a speed within a predetermined opposite direction speed range, the angular difference being greater than or equal to a predetermined second threshold angular difference for opposite direction determination;

the electronic control unit is configured to determine that a right traffic situation that is the traffic situation with respect to the right target object occurs, when a value based on a total of the number of the right-side in-region same direction objects and the number of the right-side in-region opposite direction objects is greater than or equal to a predetermined value; and the electronic control unit is configured to forbid generation of the driving assistance request signal for the right target object when the electronic control unit determines that the right target object is present and that the right traffic situation occurs.

* * * * *